United States Patent
Tachibana et al.

(10) Patent No.: US 6,886,241 B2
(45) Date of Patent: May 3, 2005

(54) AUTOMATIC PISTON INSTALLATION APPARATUS

(75) Inventors: Katsuyoshi Tachibana, Tokyo (JP); Toshimitsu Kimura, Tokyo (JP); Hitoshi Moritani, Tokyo (JP); Yuichiro Ueda, Tokyo (JP)

(73) Assignee: Hirata Corporation, Tokyo (JP)

( * ) Notice: Subject to any disclaimer, the term of this patent is extended or adjusted under 35 U.S.C. 154(b) by 99 days.

(21) Appl. No.: 10/349,444

(22) Filed: Jan. 22, 2003

(65) Prior Publication Data

US 2003/0167628 A1 Sep. 11, 2003

(30) Foreign Application Priority Data

Mar. 11, 2002 (JP) .................................... P2002-065935

(51) Int. Cl.[7] ............................................... B23P 10/00
(52) U.S. Cl. ......................... 29/791; 29/795; 29/281.5; 29/283; 29/888.01
(58) Field of Search ........................ 29/791, 794, 822, 29/213.1, 235, 281.5, 283, 888.044, 888.01, 407.09, 888, 428

(56) References Cited

U.S. PATENT DOCUMENTS 3,952,393 A * 4/1976 van Ravenzwaay et al. .. 29/795
4,887,341 A * 12/1989 Sakimori et al. ........ 29/888.01
6,047,472 A    4/2000 Koch

FOREIGN PATENT DOCUMENTS

JP    2000-198030    1/1999

* cited by examiner

Primary Examiner—John C. Hong
(74) Attorney, Agent, or Firm—Pillsbury Winthrop LLP

(57) ABSTRACT

An automatic piston installation apparatus according to the present invention includes a block positioning mechanism for positioning a cylinder block in a working area separated from a conveying line by moving the cylinder block in vertical and horizontal directions and by rotating the cylinder block around the crankshaft, a piston positioning mechanism for positioning the piston at an insertion position by moving the piston to the working area, a piston inserting mechanism for inserting the piston into a cylinder bore from above in the vertical direction, a cap positioning mechanism for positioning the connecting-rod cap by moving the connecting-rod cap to a fastened position in the working area, and a fastening mechanism for fastening the connecting-rod cap from below in the vertical direction. Thereby, the piston can be installed in various engines, such as inline-type and V-type engines, automatically, with a high degree of accuracy, and reliably, and productivity can also be improved.

19 Claims, 21 Drawing Sheets

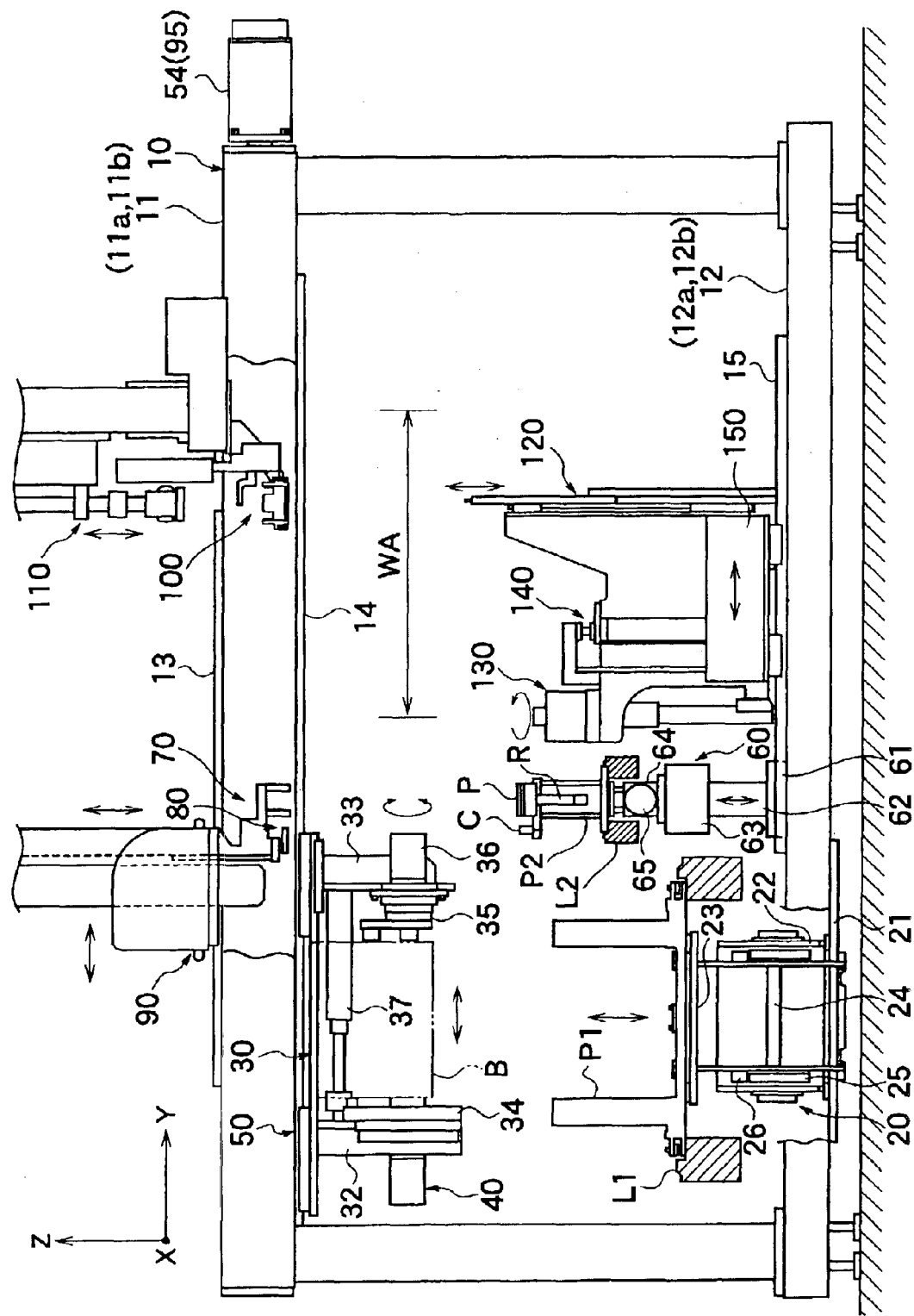

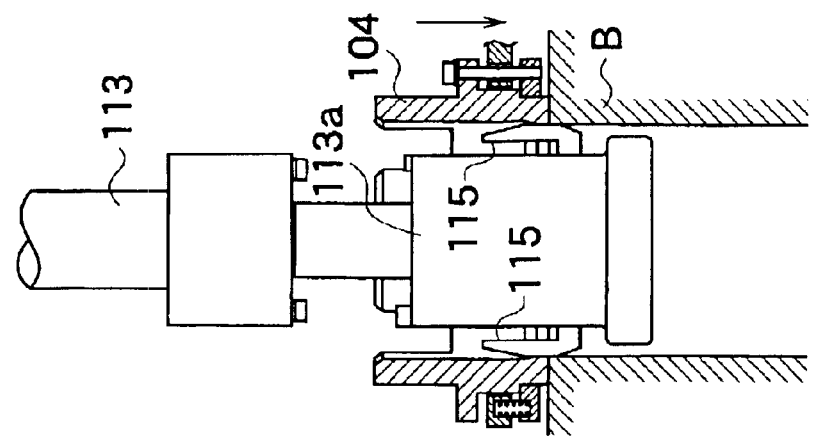
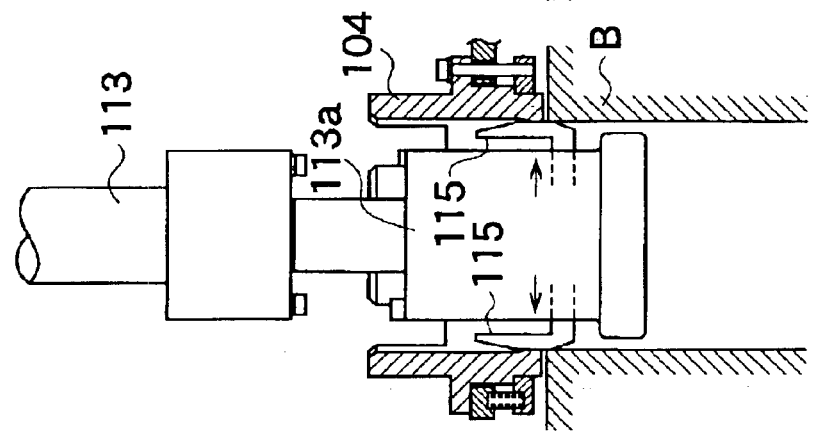
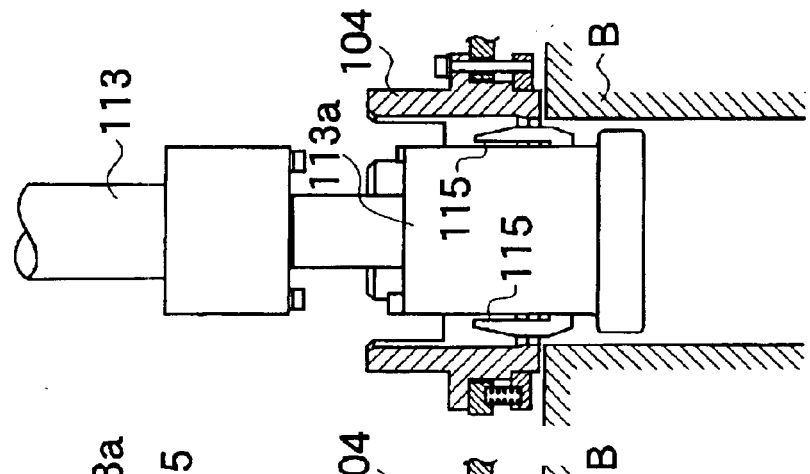
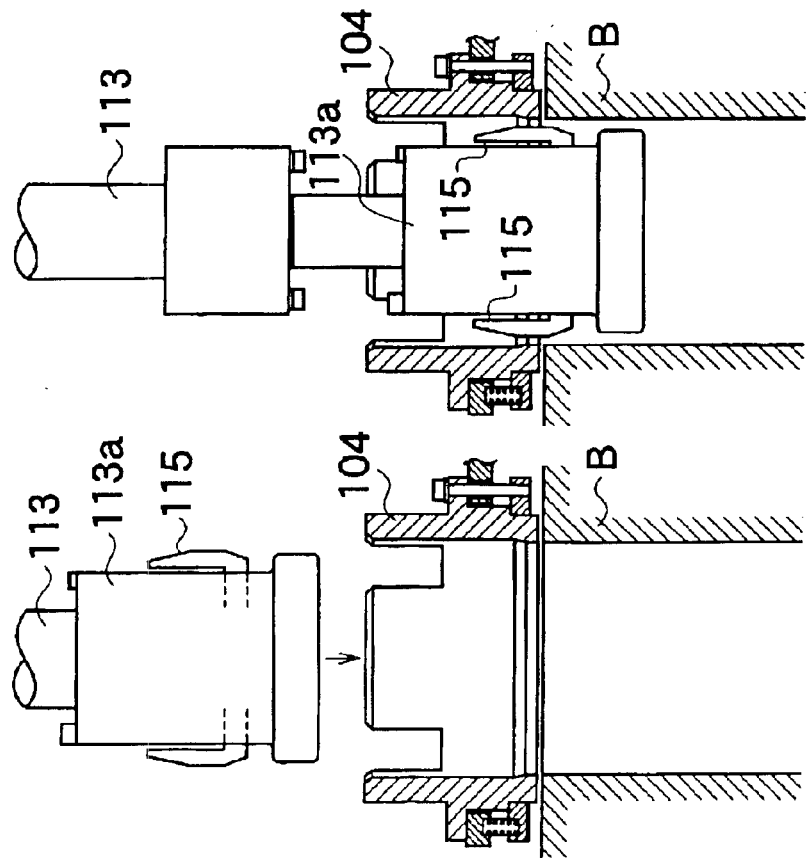

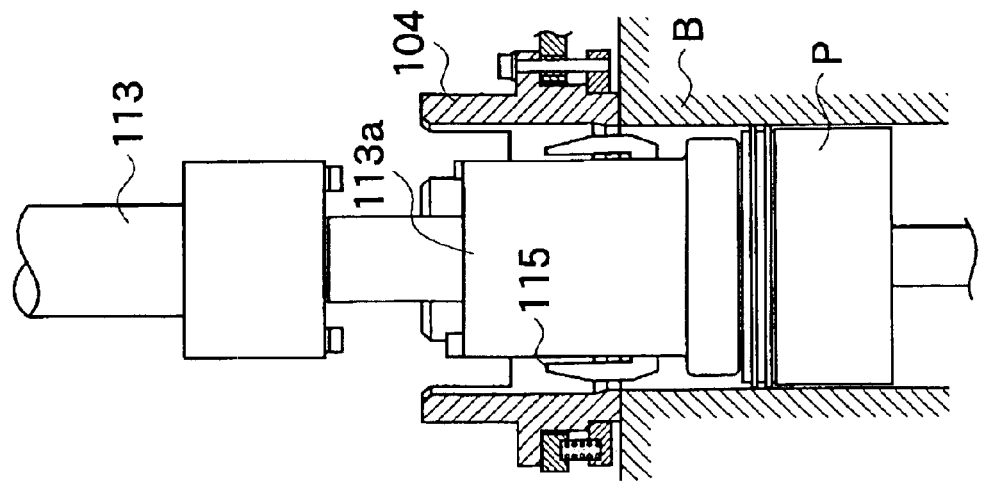
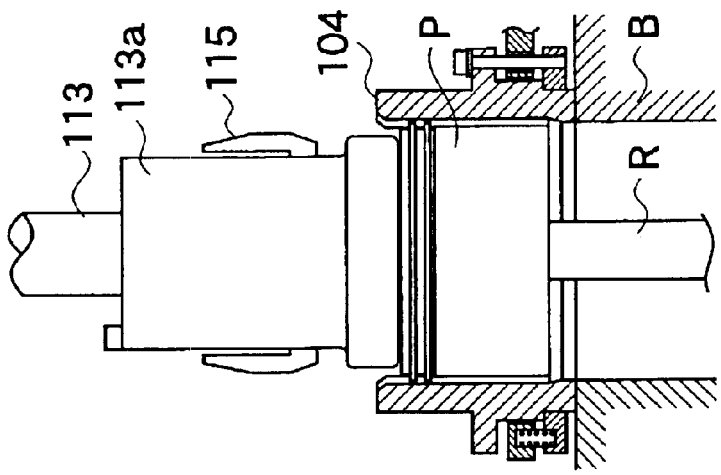
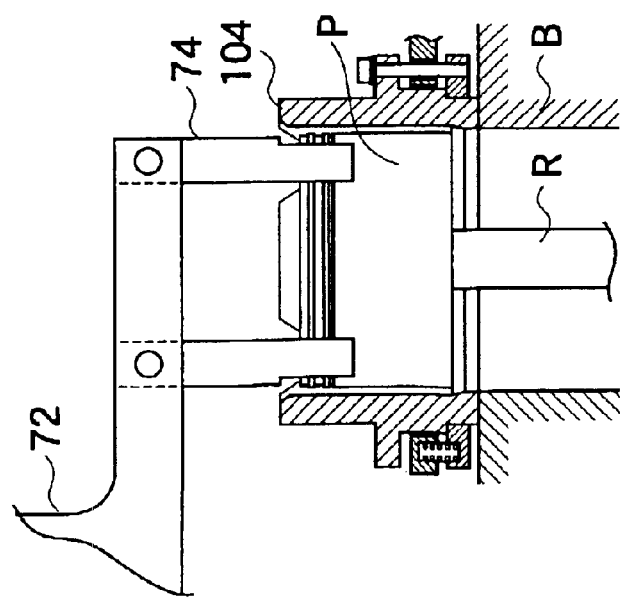

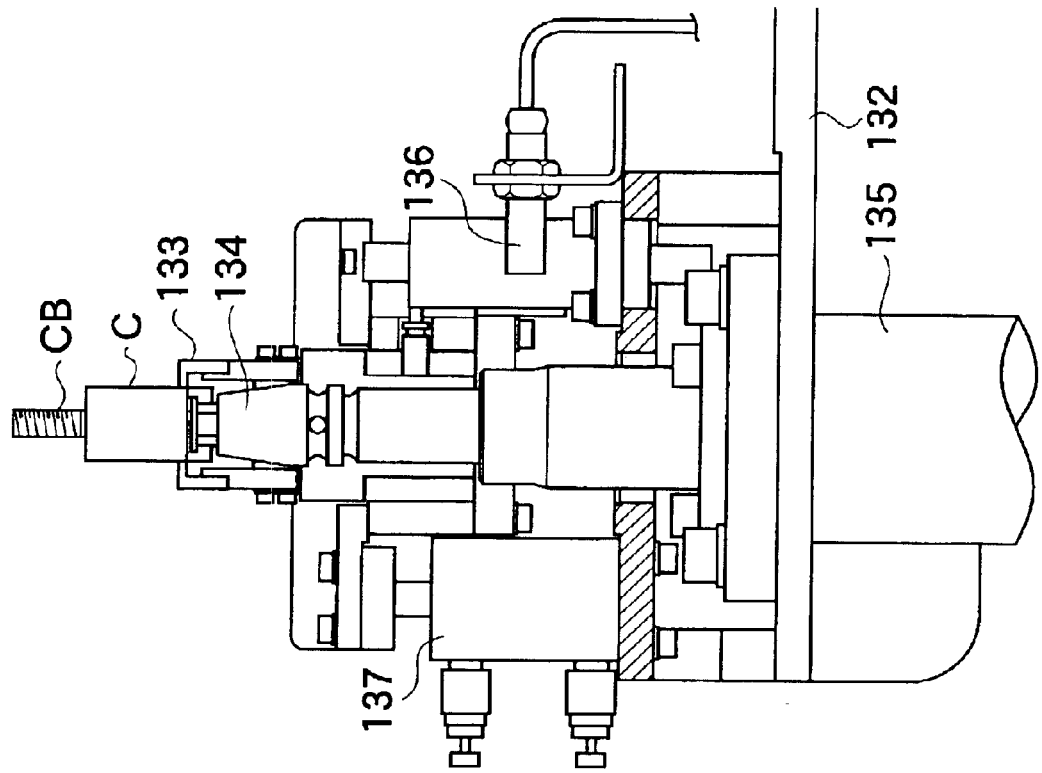
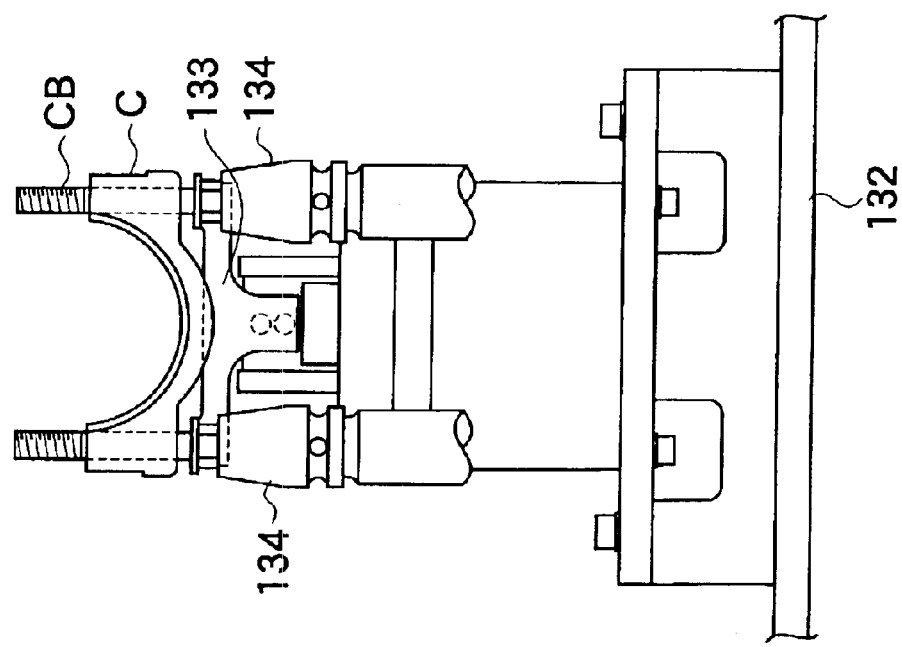

AUTOMATIC PISTON INSTALLATION APPARATUS

BACKGROUND OF THE INVENTION

1. Field of the Invention

The present invention relates to an automatic piston-installation apparatus for inserting a piston to which a connecting rod is pre-attached into an engine cylinder block and automatically installing the piston to a crankshaft. More specifically, the present invention relates to an automatic piston installation apparatus for automatically installing a piston in a multiple cylinder engine in which cylinder bores are arranged in a line or in the shape of a "V".

2. Description of the Related Art

An apparatus disclosed in Japanese Unexamined Patent Publication No. H2000-198030 is known as an example of an apparatus for inserting a piston into an engine cylinder block. In the piston insertion apparatus disclosed in this publication, an inline four-cylinder type engine is conveyed by a conveying line, and is positioned at a predetermined position, and, thereafter, a piston is guided to a cylinder bore by use of a guide cylinder while being pushed with a pushing member from above.

This piston insertion apparatus is designed so that the piston can be smoothly inserted while positioning both the piston and the cylinder bore by use of the guide cylinder when the piston is inserted into the cylinder bore.

Additionally, the engine to be used here is an inline-type multiple cylinder engine in which cylinder bores are arranged in a line and which is conveyed by the conveying line while being directed upward. In this engine, a cylinder block is positioned merely by stopping it in the course of a conveyance, and no consideration is given to piston insertion in an engine in which the penetrating directions of cylinder bores differ from each other like a V-type multiple cylinder engine that has cylinder bores arranged in the shape of a "V".

The conventional apparatus is, as described above, designed to automatically perform only the piston-inserting operation, and not designed to automatically perform all of the installing operations of the piston and the connecting rod after completion of the insertion, including the connection of the connecting rod thereto.

Therefore, if an attempt is made to automatically perform all procedures until the piston is attached to a crankshaft (crankpin) after the piston is inserted, the piston can be inserted merely by stopping and positioning the cylinder block conveyed by the conveying line at a predetermined position, but it is difficult to fix the connecting rod thereto from below because the conveying line is positioned at a lower place.

Additionally, the piston can be inserted into the cylinder block of the inline-type engine, whereas the piston can not be easily inserted into the cylinder block of the V-type engine.

Still additionally, since a connecting-rod cap used to pinch the crankpin is needed for connecting-rod connection, attention must be paid to a method for supplying the connecting-rod cap.

Therefore, in engines used for automatic piston installation, such as the inline-type engine, the V-type engine, and various engines that differ in bore diameter, in bore pitch, or in stroke, it is difficult to insert the piston into all cylinder bores, then fix the connecting-rod cap, and perform piston installation merely by stopping the cylinder block conveyed by the conveying line and positioning it on the conveying line.

Additionally, in a case where the piston is installed by positioning the cylinder block on the conveying line, the piston can be inserted from above in a vertical direction, but the connecting-rod cap can not be fastened from below in the vertical direction. Therefore, the connecting-rod cap must be fastened after the direction of the cylinder block is changed sideward, for example. This change in direction of the cylinder block brings about an increase in the number of installation steps, difficulty in shortening the installation time, and a concern that the piston will be deviated from a correct position during the change in direction of the cylinder block. Therefore, it is extremely difficult to install all pistons with a high degree of accuracy.

The present invention has been made in consideration of the aforementioned circumstances. It is therefore an object of the present invention to provide an automatic piston installation apparatus capable of automatically performing all installing operations ranging from piston insertion to connecting-rod connection into an engine cylinder block in a working area apart from a conveying line and capable of automatically installing pistons not only in single cylinder engines but also in multiple cylinder engines such as inline-type and V-type engines.

SUMMARY OF THE INVENTION

An automatic piston installation apparatus according to the invention to achieve the above-mentioned object, for inserting a piston provided with a connecting rod into a cylinder bore, then fastening a connecting-rod cap, and assembling the piston to a crankshaft with respect to a cylinder block provided with the crankshaft, wherein the automatic piston installation apparatus includes a block positioning mechanism for positioning the cylinder block at a predetermined position by moving the cylinder block in a vertical or horizontal direction or by rotating the cylinder block around the crankshaft, a piston positioning mechanism for positioning the piston by moving the piston so as to be inserted into the cylinder block positioned by the block positioning mechanism from above in the vertical direction, a piston inserting mechanism for inserting the piston positioned by the piston positioning mechanism into the cylinder bore from above in the vertical direction, a cap positioning mechanism for positioning the connecting-rod cap by moving the connecting-rod cap so as to be fastened to the connecting rod of the piston inserted by the piston inserting mechanism from below in the vertical direction, and a fastening mechanism for fastening the connecting-rod cap from below in the vertical direction.

According to this structure, the block positioning mechanism positions a cylinder block conveyed by a conveying line at a predetermined position in the working area by moving it in the vertical and horizontal directions or by rotating it, the piston positioning mechanism moves a piston conveyed by a conveying line and positions it at the insertion position of the cylinder block, the piston inserting mechanism inserts the positioned piston into the cylinder bore from above in the vertical direction, the cap positioning mechanism moves and positions a connecting-rod cap conveyed by the conveying line at a fastening position, and the fastening mechanism fastens the connecting-rod cap from below in the vertical direction, thereby performing automatic piston installation.

Accordingly, all steps of the piston installation are automated by the respective mechanisms, and the piston insertion and the fastening of the connecting-rod cap that corresponds to the piston insertion is performed for the cylinder block (i.e., a series of cylinder bores, e.g., cylinder bores on either side in a V-type multiple cylinder engine) positioned at the predetermined position in the working area without a change in direction. Therefore, the installation is carried out with a high degree of accuracy and reliability, and productivity in engine assembly rises, and, in addition, the piston installation can be performed for various kinds of engines such as inline-type engines and V-type engines.

In the aforementioned structure, the block positioning mechanism may be constructed to include a block elevating unit for separating the cylinder block conveyed by the conveying line from the conveying line and holding the cylinder block; a block gripping unit for gripping the cylinder block held by the block elevating unit and rotating the cylinder block so as to direct its cylinder bore in the vertical direction; a shaft rotating unit, formed integrally with the block gripping unit, for rotating the crankshaft; and a block transferring unit for transferring the block gripping unit in the horizontal direction and positioning the block gripping unit at a predetermined position in the working area.

According to this structure, the block elevating unit elevates the cylinder block conveyed by the conveying line, the block gripping unit directs the elevated cylinder block in a predetermined direction while gripping the cylinder block, the shaft rotating unit rotates the crankshaft at a predetermined position, and the block transferring unit transfers the block gripping unit in the horizontal direction and positions the cylinder block at a predetermined position in the working area. Since the directing, positioning, etc., of the cylinder block are carried out by the respective units in this way, a series of operations can be performed with a high degree of accuracy, smoothly, and reliably.

In the aforementioned structure, the piston positioning mechanism may be constructed to include a holding unit for separating the piston conveyed by the conveying line from the conveying line and holding the piston and for moving the piston in the horizontal direction and positioning the piston, a piston gripping unit for moving the piston held by the holding unit in the vertical direction while gripping the piston, and a transferring unit for transferring the piston gripping unit in the horizontal direction and positioning the piston gripping unit at a predetermined position in the working area.

According to this structure, the holding unit separates the piston conveyed by the conveying line from the conveying line and positions it at a predetermined position in the horizontal direction, the piston gripping unit positions the piston at a predetermined position in the vertical direction while gripping the piston placed at the predetermined position, and the transferring unit transfers the piston gripping unit in the horizontal direction and positions the piston gripping unit at an insertion position on the cylinder block in the working area. Since the holding, positioning, etc., of the piston are carried out by the respective units in this way, a series of operations can be performed with a high degree of accuracy, smoothly, and reliably.

In the aforementioned structure, the piston inserting mechanism may be constructed to include a piston guide unit for guiding the piston gripped by the piston gripping unit into a cylinder bore, a pushing unit for pushing the piston guided by the piston guide unit from above, and a connecting-rod guide unit for guiding the connecting rod of the piston pushed by the pushing unit while lowering the connecting rod.

According to this structure, the piston guide unit guides the piston while directing the piston toward the cylinder bore when the piston is inserted, the pushing unit pushes the guided piston from above, and the connecting-rod guide unit guides the connecting rod swingably connected while lowering the connecting rod. Accordingly, the connecting rod is prevented from, for example, colliding with the cylinder bore, and the piston is smoothly inserted into the cylinder bore.

Herein, the piston guide unit may be constructed to include a plurality of guide cylinders having predetermined inner diameters so as to guide different kinds of pistons, respectively, and a guide-cylinder switching mechanism for appropriately selecting and switching the plurality of guide cylinders and positioning them on cylinder bores, and the pushing unit may be constructed to include a columnar pressing portion that can make contact with an upper surface of the piston and a chuck freely protruding/retracting in the radial direction from an outer circumferential surface of the pressing portion so as to perform centering between the guide cylinder and the cylinder bore while making contact with inner circumferential surfaces of the guide cylinder and the cylinder bore.

According to this structure, a corresponding guide cylinder is selected by the guide-cylinder switching mechanism when pistons that correspond to different kinds of cylinder blocks, respectively, are inserted. Accordingly, the different kinds of pistons can be smoothly inserted into corresponding cylinder blocks without providing another apparatus. Additionally, in a state where the chuck is retracted, the pressing portion is inserted at a position facing inner circumferential surfaces of the guide cylinder and the cylinder bore, and thereafter the chuck protrudes outward in the radial direction. Thereby, simultaneous centering is performed between the guide cylinder and the cylinder bore. As a result, the piston is guided with a high degree of accuracy.

In the aforementioned structure, the piston guide unit may be constructed to include a two-stage driving mechanism for performing first driving by which the guide cylinder is positioned at a non-contact position close to an upper end surface of the cylinder block and second driving by which the guide cylinder is brought into close contact with the upper end surface of the cylinder block, and the pushing unit may be constructed to include a driving mechanism by which the pressing portion is lowered to an area covering the guide cylinder and the cylinder bore in a state where the chuck is retracted, and, thereafter, the chuck is caused to protrude so as to make contact with the inner circumferential surfaces of the guide cylinder and the cylinder bore. The two-stage driving mechanism performs the second driving in a state where the chuck is in contact with the inner circumferential surfaces of the guide cylinder and the cylinder bore by driving the driving mechanism.

According to this structure, the two-stage driving mechanism positions the guide cylinder just above and in the vicinity of the cylinder block by means of the first driving, thereafter the driving mechanism lowers the pressing portion to the area covering the guide cylinder and the cylinder bore in a state where the chuck is retracted, thereafter makes the chuck protrude so as to perform centering therebetween, and thereafter the two-stage driving mechanism brings the guide cylinder into close contact with the upper end surface of the cylinder block by means of the second driving. As a result, the guide cylinder is positioned more smoothly and reliably with respect to the cylinder bore.

In the aforementioned structure, the cap positioning mechanism may be constructed to include a holding unit for separating a connecting-rod cap conveyed by the conveying line from the conveying line and holding the connecting-rod cap and for moving the connecting-rod cap in the horizontal direction so as to position it, a cap gripping unit for moving the connecting-rod cap held by the holding unit in the vertical direction while gripping the connecting-rod cap, and a transferring unit for transferring the cap holding unit in the horizontal direction and positioning the cap holding unit at a predetermined position in the working area.

According to this structure, the holding unit separates a connecting-rod cap conveyed by the conveying line from the conveying line and positions it at the predetermined position in the horizontal direction, the cap gripping unit grips the connecting-rod cap placed at the predetermined position and positions it at a predetermined position in the vertical direction, and the transferring unit transfers the cap gripping unit in the horizontal direction and positions it at a predetermined position below the cylinder block in the working area. Since the holding, positioning, etc., of the connecting-rod cap are carried out by the respective units in this way, a series of operations can be performed with a high degree of accuracy, smoothly, and reliably.

The aforementioned structure may be formed such that the cap gripping unit is formed integrally with the piston gripping unit, and the transferring unit of the piston gripping unit serves also as the transferring unit of the cap gripping unit.

According to this structure, since the cap gripping unit is integrally incorporated into the piston gripping unit, a single transferring unit is sufficient to be used herein, and therefore the structure is simplified.

The aforementioned structure may be formed such that a piston and a connecting-rod cap are held by the same pallet, and the holding unit of the piston serves also as the holding unit of the connecting-rod cap.

According to this structure, a single holding unit is sufficient to be used herein, and therefore the structure is simplified.

In the aforementioned structure, the fastening mechanism may be constructed to include a fastening unit for holding a connecting-rod cap transferred by the transferring unit and exerting a fastening force on a fastening bolt, a fastening elevating unit for elevating the fastening unit, and a transferring unit for transferring the fastening unit and the fastening elevating unit in the horizontal direction and positioning these at a predetermined position in the working area.

According to this structure, the transferring unit transfers the fastening unit to a corresponding fastening position and positions it for fastening, and the fastening unit screws a fastening bolt from below in the vertical direction so as to fasten the connecting-rod cap while the fastening elevating unit is adjusting the height. The positioning, fastening, etc., of the connecting-rod cap are carried out by the respective units in this way, and the piston is pressed by the piston pushing unit from above when the connecting-rod cap is fastened, and therefore a series of operations can be performed with a high degree of accuracy, smoothly, and reliably.

The aforementioned structure may include a transferring unit for transferring the connecting-rod guide unit in the horizontal direction and positioning it at a predetermined position, and the transferring unit of the connecting-rod guide unit may serve also as the transferring unit of the fastening unit and the fastening elevating unit.

According to this structure, a single transferring unit is sufficient to be used herein, and therefore the structure is simplified. Additionally, switching between the guide operation by the connecting-rod guide unit and the fastening operation by the fastening unit is carried out by appropriately adjusting the single transferring unit.

In the aforementioned structure, a pallet that holds both a piston and a connecting-rod cap may be conveyed by the same conveying line together with a pallet of the cylinder block.

According to this structure, a dedicated conveying line used to convey only a piston and a connecting-rod cap becomes unnecessary, and the conveying system is simplified.

The aforementioned structure may include an upper frame and a lower frame that are apart from each other and are disposed in parallel, in which the upper frame supports the block transferring unit and the transferring unit of both the piston gripping unit and the cap gripping unit, whereas the lower frame supports the transferring unit of the connecting-rod guide unit, the fastening unit, and the fastening elevating unit.

According to this structure, the respective units can be disposed at optimum positions, and the respective supporting and moving spaces can be set in optimum areas by employing a frame construction including the upper and lower frames i.e., a gantry robot. Therefore, switching between operations of the respective units can be smoothly carried out, productivity can be raised, and the size of the apparatus can be reduced.

BRIEF DESCRIPTION OF THE DRAWINGS

FIG. 1 is a schematic view showing an embodiment of the automatic piston-installation apparatus according to the present invention.

FIGS. 11A, 11B, 11C, and 11D are each a state diagram in the positioning operation of the guide cylinder.

FIGS. 12A, 12B, and 12C are each a state diagram in the inserting operation of the piston.

FIG. 15A and FIG. 15B are each an enlarged view showing the fixing unit.

DESCRIPTION OF THE PREFERRED EMBODIMENTS

Figure 2A:
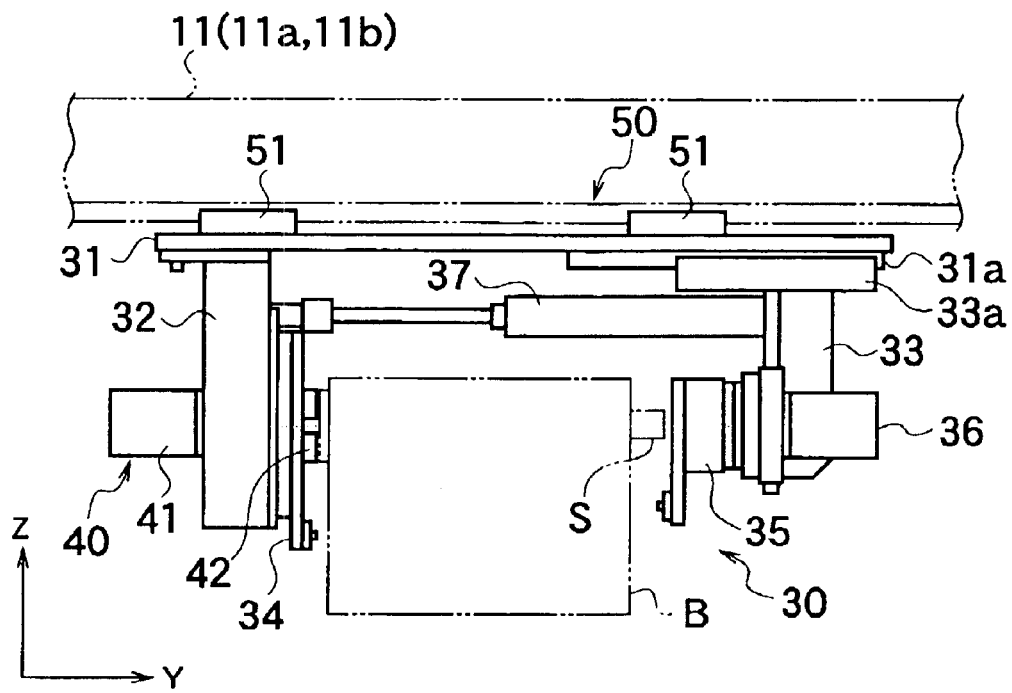
FIG. 2A and FIG. 2B show portions of units that form the apparatus of FIG. 1, FIG. 2A being a front view showing a block gripping unit, FIG. 2B being a side view showing a block transferring unit, etc.

Embodiments of the present invention will hereinafter be described with reference to the attached drawings.

FIG. 1 through FIG. 13 show an embodiment of an automatic piston installation apparatus according to the present invention. As shown in FIG. 1, this apparatus includes a gantry robot 10 that has a frame construction and sets relative positional relationships among various units, a block elevating unit 20 for separating a cylinder block B conveyed by a conveying line L1 (e.g., linear conveyer) from the conveying line and holding the cylinder block B, a block gripping unit 30 for gripping the cylinder block B held by the block elevating unit 20 and rotating the cylinder block B, a shaft rotating unit 40 formed integrally with the block gripping unit 30 for rotating a crankshaft, and a block transferring unit 50 for transferring the block gripping unit 30 in a Y direction (i.e., horizontal direction) and positioning it at a predetermined position in a working area WA.

The apparatus further includes, as shown in FIG. 1, a holding unit 60 for separating a piston P and a connecting-rod cap C that have been conveyed by a conveying line L2 (e.g., linear conveyer) from the conveying line L2 and holding them and, in addition, positioning them by appropriately moving them in an X direction (i.e., direction perpendicular to the Y direction), a piston gripping unit 70 for moving the piston P held by the holding unit 60 in a Z direction (i.e., vertical direction) while gripping the piston P, a cap gripping unit 80 for moving the connecting-rod cap C in the Z direction while gripping the connecting-rod cap C, and a transferring unit 90 for transferring the piston gripping unit 70 and the cap gripping unit 80 in the Y direction (i.e., horizontal direction) and positioning them at a predetermined position in the working area WA.

The apparatus further includes, as shown in FIG. 1, a piston guide unit 100 for guiding the piston P into a cylinder bore, a pushing unit 110 for pushing the piston P guided by the piston guide unit 100 from above, a connecting-rod guide unit 120 for guiding a connecting rod R of the piston P pushed by the pushing unit 110 while lowering the connecting rod R, a fastening unit 130 for holding the connecting-rod cap C and exerting a fastening force on a fastening bolt CB, a fastening elevating unit 140 for elevating the fastening unit 130, and a transferring unit 150 for holding and transferring the fastening unit 130, the fastening elevating unit 140, and the connecting-rod guide unit 120 in the Y direction (horizontal direction) and positioning them at a predetermined position in the working area WA.

Figure 2B:
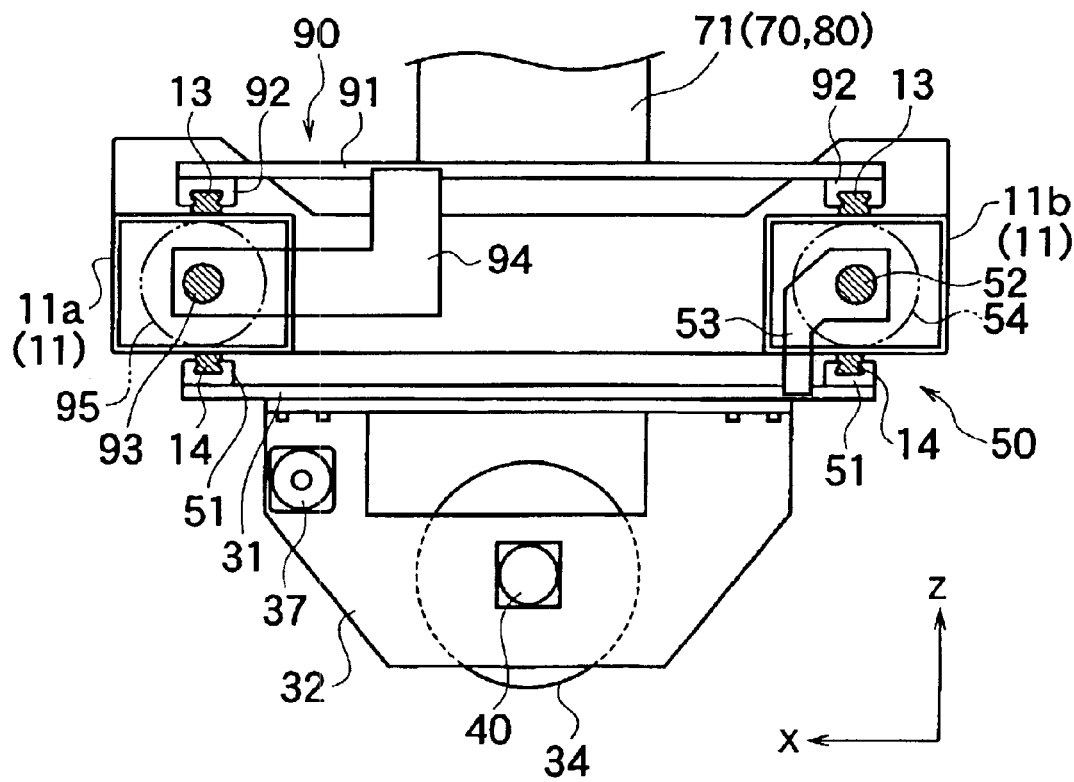

As shown in FIG. 1 and FIG. 2B, the gantry robot 10 includes an upper frame 1(11a, 11b) and a lower frame 12(12a, 12b) that are separated from each other in the Z direction (vertical direction) and are disposed in parallel, and the gantry robot 10 is disposed in the course of the path of the conveying lines L1 and L2 extending in the X direction so as to support various units.

As shown in FIG. 1 and FIG. 2A, the upper frame 11(11a, 11b) has an LM rail 13 extending in the Y direction so as to guide the transferring unit 90 on the upper surface thereof, and has an LM rail 14 extending in the Y direction so as to guide the block transferring unit 50 on the undersurface thereof. Accordingly, since the transferring lines (rails) are provided on the upper and lower surfaces, respectively, of the upper frame 11, more effective utilization can be achieved than a case where they are provided on the surfaces of different frames, and the structure can be simplified correspondingly therewith.

As shown in FIG. 2B, a ball screw (lead screw) 93 and a drive motor 95, which are constituent elements of the transferring unit 90, and a ball screw (lead screw) 52 and a drive motor 54, which are constituent elements of the transferring unit 50, are disposed inside the upper frame 11(11a, 11b) and on the end face thereof.

The lower frame 12(12a, 12b) has, as shown in FIG. 1, an LM rail 15 extending in the Y direction so as to guide the transferring unit 150 through a fixed base 151 described later.

As shown in FIG. 1, the block elevating unit 20 is disposed under the conveying line LI, and is formed of a base 22 fixed to a substrate 21 that spans the lower frame 12, an elevating table 23 that is guided ascendably/descendably in the Z direction (vertical direction) with respect to the base 22 and can support a pallet P1, a rotational shaft 24 rotatably supported by the base 22, an eccentric cam 25 fixed to the rotational shaft 24, a cam follower 26 rotatably disposed on the elevating table 23, and a drive motor (not shown) that exerts a driving force on the rotational shaft 24.

Accordingly, the pallet P1 on which the cylinder block B is placed is conveyed by the conveying line L1, the pallet P1 is then stopped at a predetermined position by a stopper mechanism (not shown), the drive motor is then actuated to allow the elevating table 23 to move upward, and the pallet P1 is lifted and separated from the conveying line L1. On the other hand, when the drive motor runs in the opposite direction, the elevating table 23 moves downward, and the pallet P1 returns to the conveying line L1 again.

As shown in FIG. 1, FIG. 2A, and FIG. 2B, the block gripping unit 30 includes a holding plate 31 whose outline is substantially rectangular, a fixed hanging portion 32 that is fixed to the holding plate 31 and extends downward, a movable hanging portion 33 that is supported movably in the Y direction with respect to the holding plate 31 and extends downward, a gripping chuck 34 rotatably supported by the fixed hanging portion 32, a gripping chuck 35 rotatably supported by the movable hanging portion 33, a drive motor 36 that is fixed to the movable hanging portion 33 and exerts a rotational driving force on the gripping chuck 35, and an actuator 37 for adjusting a relative distance between the fixed hanging portion 32 and the movable hanging portion 33. The movable hanging portion 33 is movable in the Y direction by means of an LM guide whose LM block 33a is connected to an LM rail 31a of the holding plate 31.

Accordingly, when the actuator 37 is actuated to draw the movable hanging portion 33, the gripping chucks 34 and 35 cooperatively grip the cylinder block B. When the drive motor 36 rotates in the state of the cylinder block B being gripped, the cylinder block B is rotated around a crankshaft S, and is directed so that a cylinder bore can face the Z direction (vertical direction), for example.

As shown in FIGS. 1, 2A, and 2B, the shaft rotating unit 40 is made up of a drive motor 41 fixed to the fixed hanging portion 32 and a connection portion 42 by which the drive motor 41 is connected to the crankshaft S.

Accordingly, when the drive motor 41 rotates in the state where the cylinder block B is gripped by the gripping chucks 34 and 35, the crankshaft S rotates through the connection portion 42, and, for example, a crankpin that corresponds to a cylinder bore into which the piston P is inserted can be positioned at a lower position in the vertical direction.

As shown in FIGS. 2A and 2B, the block transferring unit 50 is made up of an LM block 51 that is fixed to the upper surface of the holding plate 31 and is connected to the LM rail 14, a ball screw 52 disposed in the upper frame 11b, a connection member 53 one end of which is connected to the ball screw 52 and is moved in the Y direction by the rotation of the ball screw 52 and the other end of which is connected to the holding plate 31, and a drive motor 54 for rotating the ball screw 52.

Accordingly, when the drive motor 54 rotates in one direction, the block gripping unit 30, i.e., the cylinder block B is moved rightward in the Y direction in FIG. 1 through the connection member 53 and is positioned at a desired position in the working area WA, whereas when the drive motor 54 rotates in the opposite direction, the cylinder block B is moved leftward in the Y direction through the connection member 53, and is positioned above the elevating unit 20.

The block elevating unit 20, the block gripping unit 30, the shaft rotating unit 40, the block transferring unit 50, etc., form a block positioning mechanism by which the cylinder block B is moved in the vertical and horizontal directions, or is rotated around the crankshaft S, and is positioned at a predetermined position.

Figure 3:
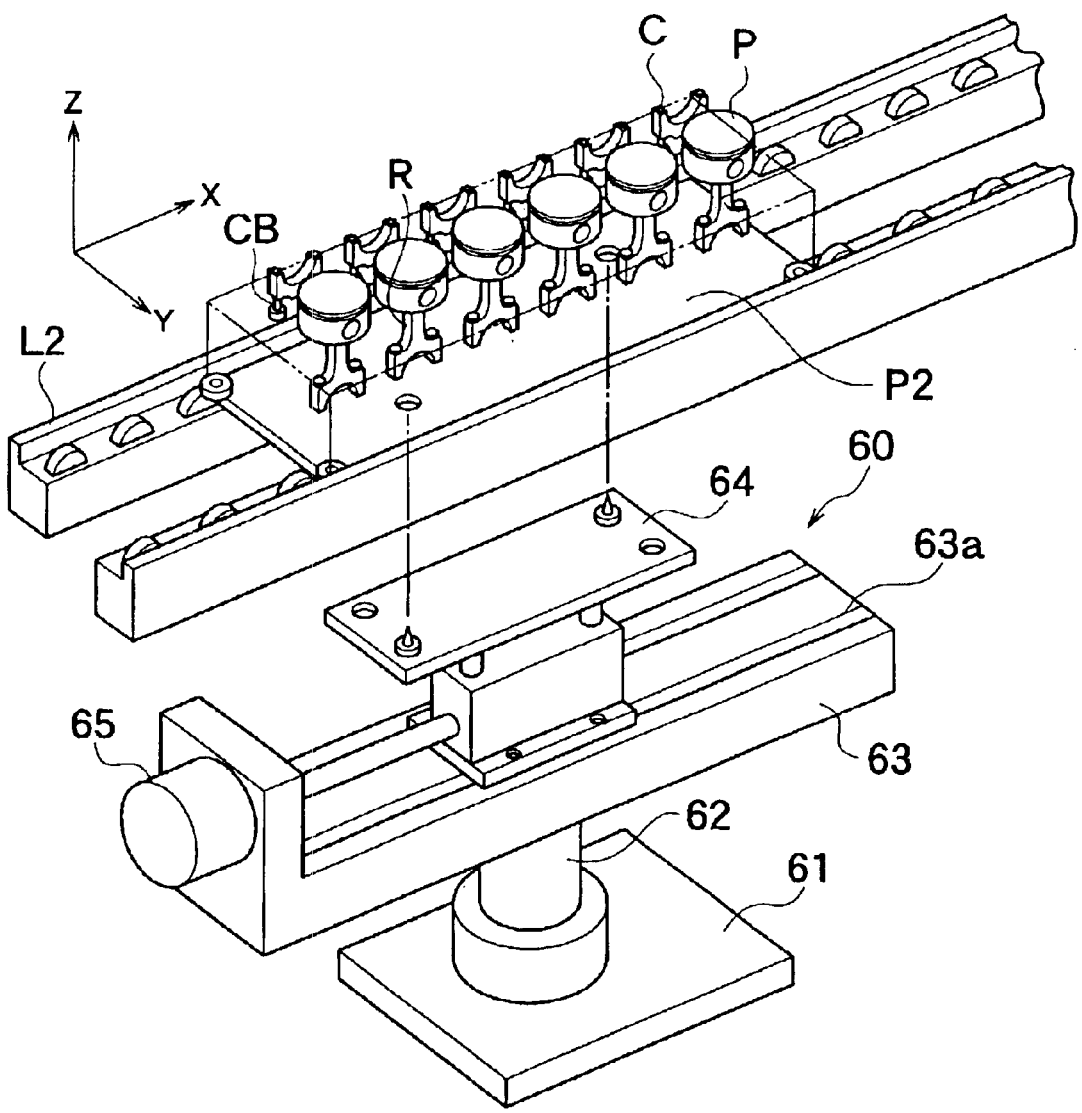
FIG. 3 is a perspective view showing a holding unit of pistons and connecting-rod caps.

As shown in FIG. 1 and FIG. 3, the holding unit 60 is disposed under the conveying line L2, and is made up of a base 61 fixed to the lower frame 12, an elevating column 62 moved upward and downward by pneumatic pressure or hydraulic pressure, a guide member 63 that is held by the elevating column 62 and has a rail 63a extending in the X direction, a movable holding portion 64 that is movably supported by the guide member 63 and can hold a pallet P2, and an actuator 65 for positioning the movable holding portion 64 by appropriately moving it at a desired position in the X direction.

Accordingly, when the pallet P2 on which the piston P and the connecting-rod cap C are placed is conveyed by the conveying line L2 and is stopped at a predetermined position by the stopper mechanism (not shown), the elevating column 62 moves upward, and the movable holding portion 64 lifts the pallet P2 and separates it from the conveying line L2. On the other hand, the elevating column 62 moves downward, whereby the pallet P2 returns to the conveying line L2 again.

Further, the movable holding portion 64 is appropriately moved to a predetermined position in the X direction by actuating the actuator 65, and the piston P and the connecting-rod cap C to be installed are appropriately positioned at a position where they are gripped by the piston gripping unit 70 and the cap gripping unit 80. A connecting rod R having a bearing metal (not shown) is swingably pre-attached to the piston P, and another bearing metal (not shown) and a fastening bolt CB are pre-attached to the connecting-rod cap C.

As shown in FIG. 1, FIG. 4, FIG. 5A, and FIG. 5B, the piston gripping unit 70 is formed of a supporting portion 71 extending in the Z direction, a movable arm 72 supported movably in the Z direction (vertical direction) by the supporting portion 71, an actuator 73 for moving the movable arm 72 to a desired height position (e.g., gripping position or inserting position of the piston P) and positioning it, four gripping pieces 74 disposed at the lower end of the movable arm 72, an actuator 75 for driving the gripping pieces 74 so as to grip or release the piston P, and a detector 76. The detector 76 is used to measure an interval at the gripping position (closed position), and, from the measurement result of the interval, detects whether or not a piston ring has dropped off from a piston-ring groove. Herein, a drive motor and a lead screw, a cylinder driving mechanism by pneumatic pressure or hydraulic pressure, an electromagnetic driving mechanism, or the like can be used as the actuators 73 and 75.

Figure 5A:
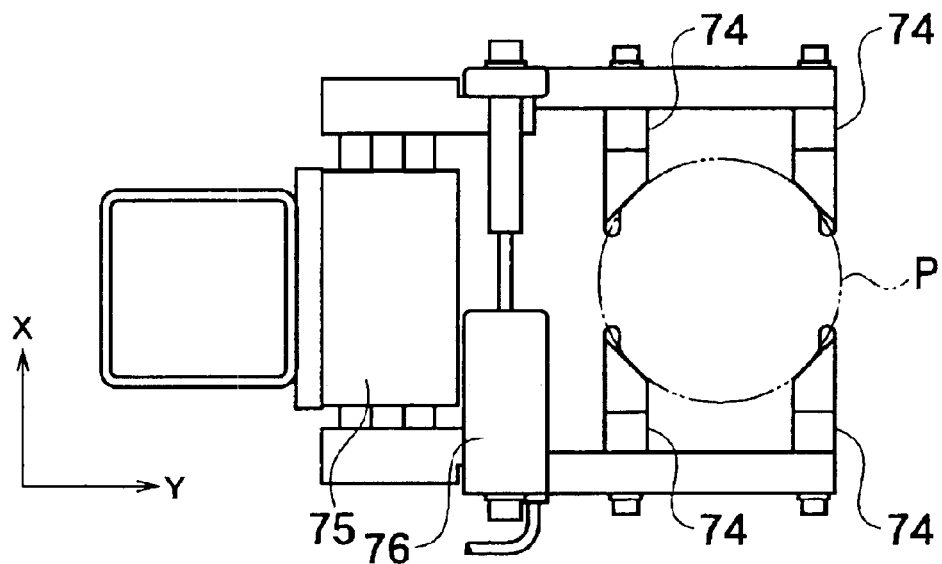
FIG. 5A is a plan view showing the piston gripping unit.
Figure 5B:
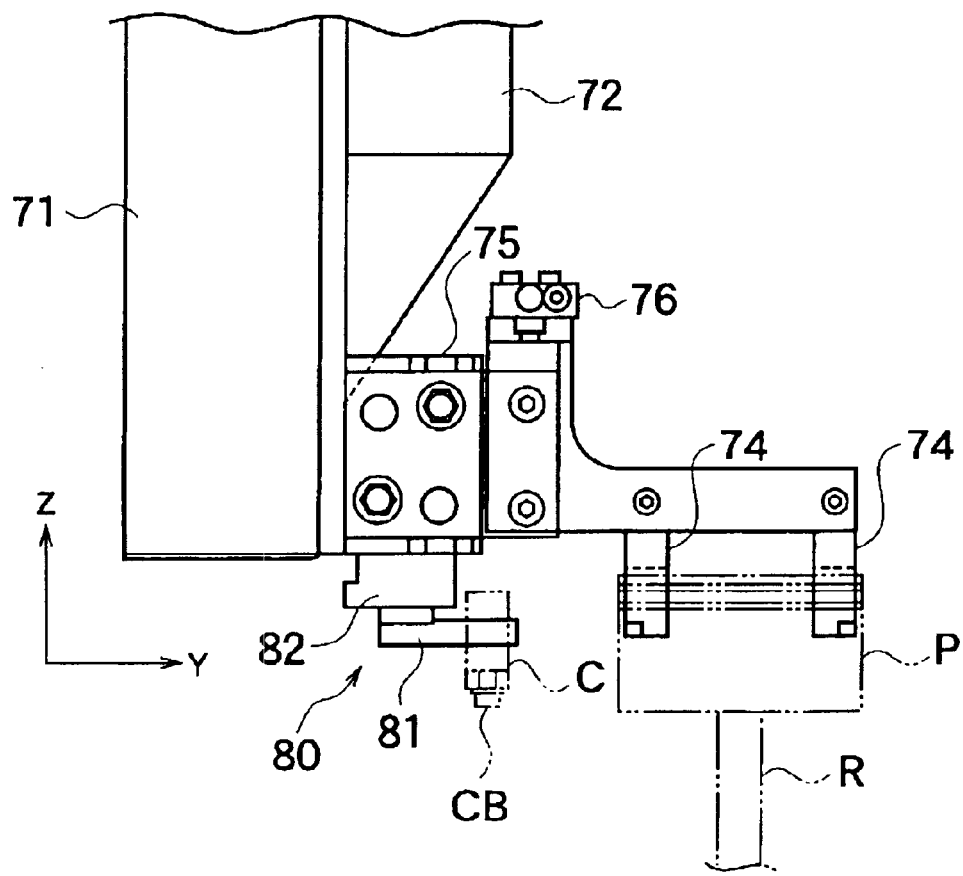
FIG. 5B is a front view showing a part of the piston gripping unit and a part of the cap gripping unit.

Accordingly, when the movable arm 72 descends to a predetermined height by operation of the actuator 73 in one direction, the gripping piece 74 is positioned in such a way as to surround the piston P placed on the pallet P2, and, thereafter, the actuator 75 is actuated, and the piston P is gripped such that the gripping piece 74 pushes the piston ring into the piston-ring groove as shown in FIG. 5A. At this time, the operation is temporarily stopped if the detector 76 detects that the piston ring has dropped off. Thereby, an operator can make a manual adjustment. Thereafter, the actuator 73 is actuated in an opposite direction, and the movable arm 72 ascends to a predetermined height together with the gripped piston P.

As shown in FIG. 1, FIG. 4, FIG. 5A, and FIG. 5B, the cap gripping unit 80 is made up of a pair of gripping pieces 81 that are provided at the lower end of the movable arm 72 forming the piston gripping unit 70 and can grip the connecting-rod cap C, and an actuator 82 for driving the pair of gripping pieces 81 so that they approach each other or recede from each other. Herein, a drive motor and a lead screw, a cylinder driving mechanism by pneumatic pressure or hydraulic pressure, an electromagnetic driving mechanism, or the like can be used as the actuator 82.

Accordingly, when the movable arm 72 descends to a predetermined height by actuating the actuator 73 forming the piston gripping unit 70 in one direction, the pair of gripping pieces 81 are positioned at both sides of the connecting-rod cap C placed on the pallet P2, and, thereafter, the actuator 82 is actuated, and the pair of gripping pieces 81 grip the connecting-rod cap C. Thereafter, the actuator 73 is actuated in an opposite direction, and the movable arm 72 ascends to a predetermined height together with the gripped connecting-rod cap C.

Figure 4:
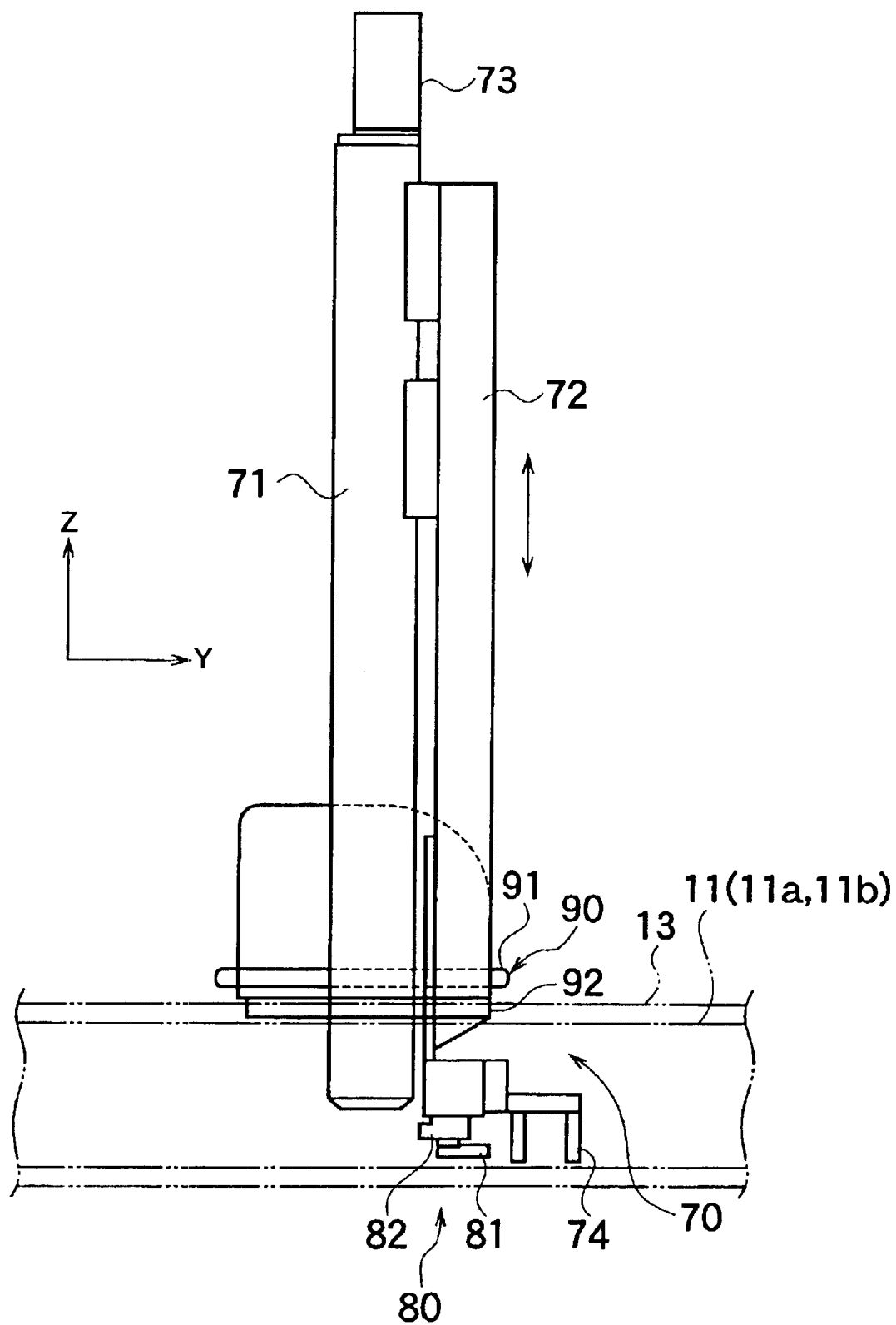
FIG. 4 is a front view showing a piston gripping unit and a cap gripping unit.

As shown in FIG. 2B and FIG. 4, the transferring unit 90 is formed of a movable base 91 that spans the upper frame 11(11a, 11b) and holds the piston gripping unit 70 (and the cap gripping unit 80), an LM block 92 that is fixed to the undersurface of the movable base 91 and is slidably connected to the LM rail 13, a ball screw 93 disposed in the upper frame 11a, a connection member 94 the end of which is connected to the ball screw 93 and is moved in the Y direction by rotation of the ball screw 93 and the other end of which is connected to the movable base 91, and a drive motor 95 for rotating the ball screw 93.

Accordingly, when the drive motor 95 rotates in one direction, the piston gripping unit 70 (and the cap gripping unit 80), i.e., the piston P (the connecting-rod cap C) is moved rightward in the Y direction in FIG. 1 through the connection member 94 and is positioned at a desired position in the working area WA, whereas when the drive motor 95 rotates in the opposite direction, the piston P is moved leftward in the Y direction in FIG. 1 through the connection member 94, and is positioned above the holding unit 60.

The holding unit 60, the piston gripping unit 70, and the transferring unit 90 form a piston positioning mechanism by which the piston P placed on the pallet P2 is moved to and positioned at an insertion position so as to insert the piston P into the cylinder block B positioned by the block positioning mechanism.

Additionally, the holding unit 60, the cap gripping unit 80, and the transferring unit 90 form a cap positioning mechanism by which the connecting-rod cap C placed on the pallet P2 is moved to and positioned at a predetermined position (i.e., a cap supporting portion 133 of a fastening unit 130 described later) so as to fasten the connecting-rod cap C to the connecting rod R of the piston P inserted in the cylinder block B.

Figure 6:
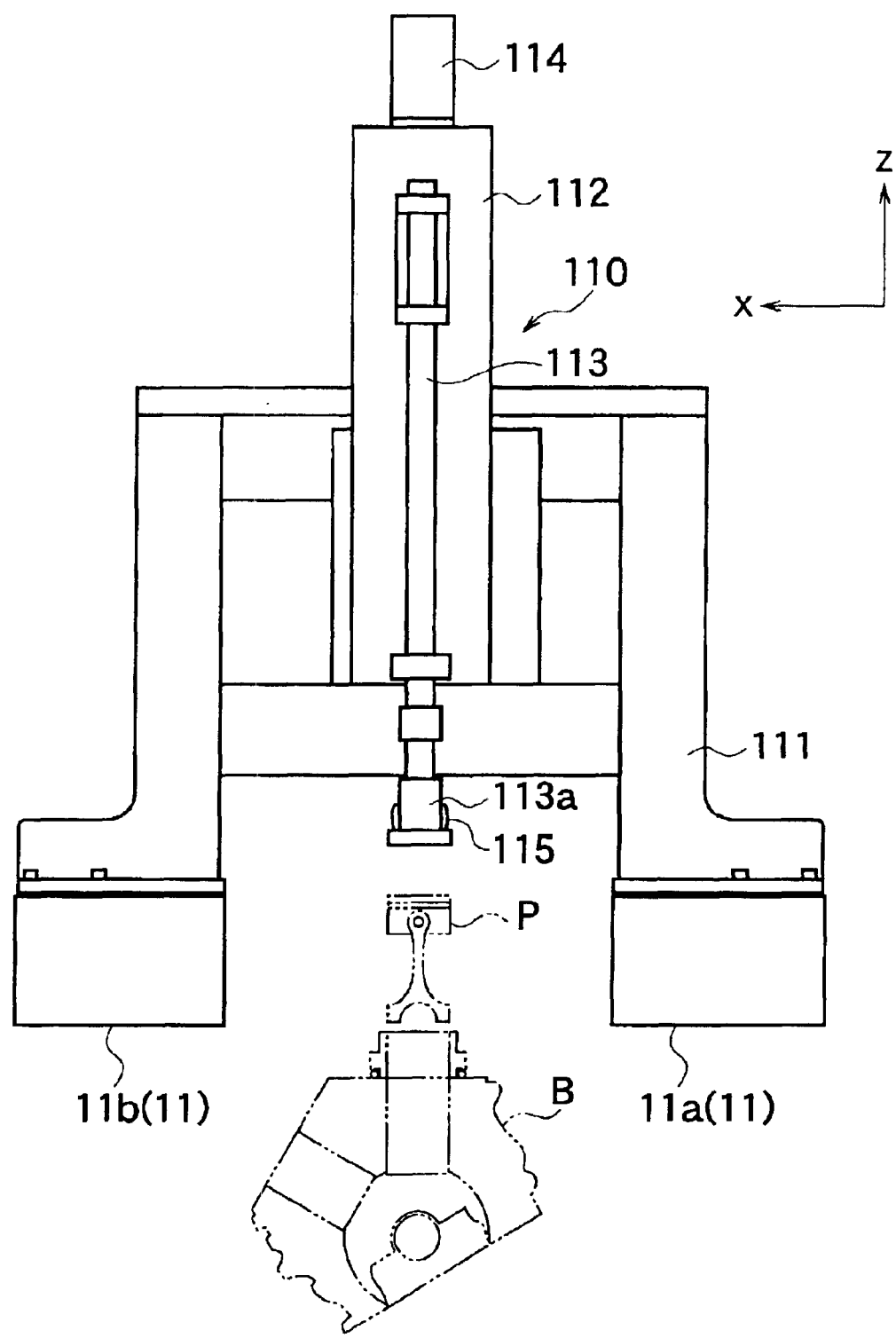
FIG. 6 is a side view showing a pushing unit.
Figure 7:
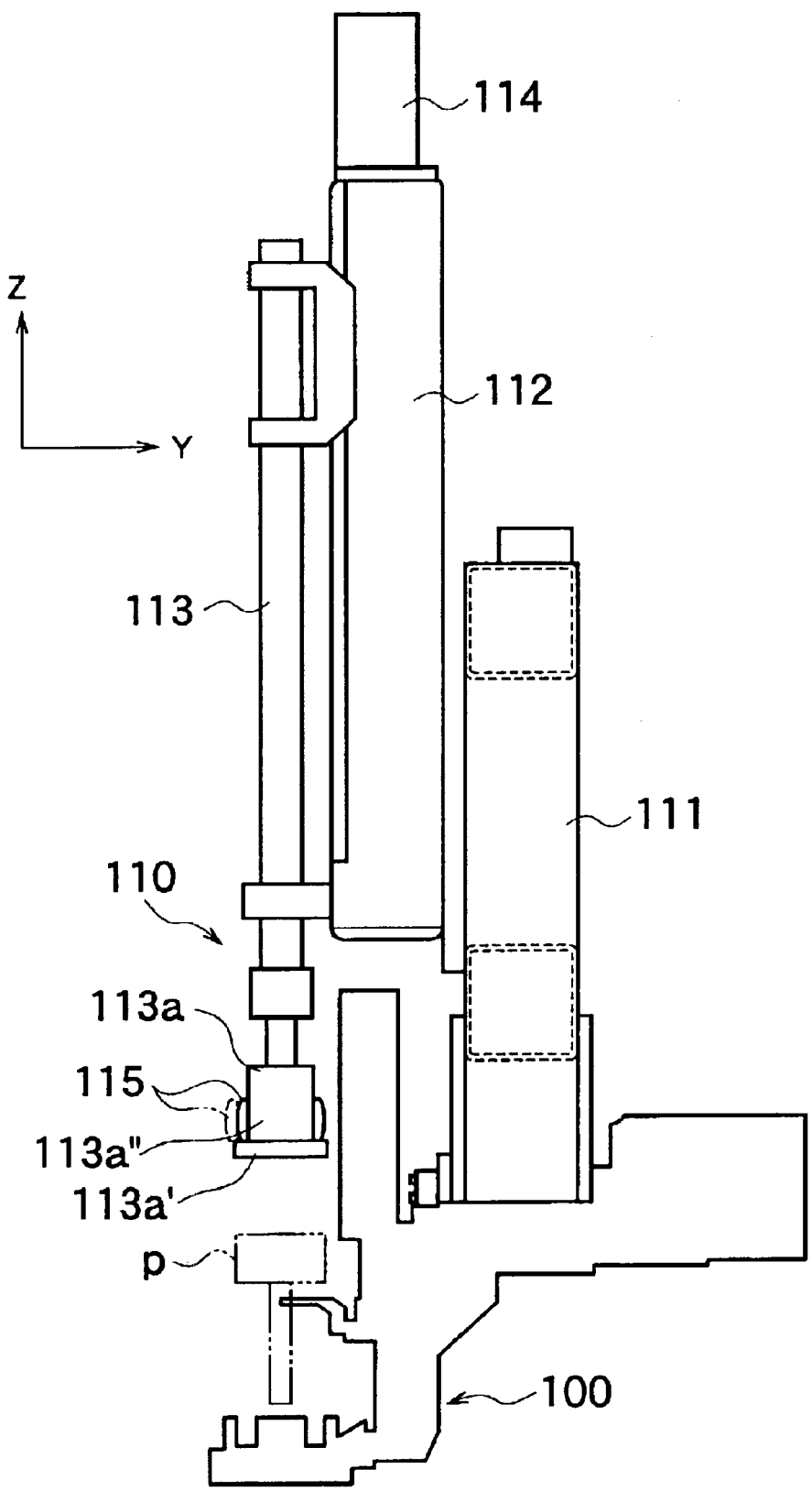
FIG. 7 is a front view showing the pushing unit and a piston guide unit.

As shown in FIG. 6 and FIG. 7, the pushing unit 110 is made up of a fixed frame 111 that spans the upper frame 11 and is fixed there, a supporting portion 112 that is disposed at the center of the fixed frame 111 and extends in the z direction, a pushing rod 113 that is supported movably in the Z direction (vertical direction) by the supporting portion 112 and has a pressing portion 113a contactable with the upper surface of the piston P at its lower end, and an actuator 114 by which the pushing rod 113 (pressing portion 113a) is moved to a desired height position (e.g., standby position prior to a pushing operation or downward stopping position during centering) or is positioned there. A drive motor and a lead screw, a cylinder driving mechanism by pneumatic pressure or hydraulic pressure, an electromagnetic driving mechanism, or the like can be used as the actuator 114.

Accordingly, when the actuator 114 is actuated in one direction in a state where the cylinder block B and the piston P are beforehand positioned at a predetermined position in the working area WA by means of the block transferring unit 50 and the transferring unit 90, the pushing rod 113 (pressing portion 113a) descends, and the piston P is pushed into the cylinder bore from above in the Z direction (vertical direction), thus performing an inserting operation.

As shown in FIG. 7, the pressing portion 113a is, as a whole, substantially columnar, and consists of a diameter widened portion 113a' contactable with the piston P and a diameter-narrowed portion 113a" disposed on the diameter-widened portion 113a". The diameter-narrowed portion 113a" is provided with a plurality of chucks 115 freely protruding/retracting outward in the radial direction from the outer circumferential surface and an actuator (not shown) for driving the protruding/retracting chucks 115. The chucks 115 are used to perform centering between a guide cylinder 104 described later and the cylinder bore (cylinder block B) by allowing the chucks 115 to simultaneously make contact with the inner circumferential surfaces of the guide cylinder 104 and the cylinder bore (cylinder block B) prior to the pushing operation of the piston P.

That is, a driving mechanism is formed according to which chucks 115 are retracted by the unillustrated actuator, the pressing portion 113a is lowered to an area covering the guide cylinder 104 and the cylinder bore by the actuator 114, and thereafter the chucks 115 are caused to protrude so as to perform centering therebetween.

As shown in FIG. 7 through FIG. 10, the piston guide unit 100 is disposed under the pushing unit 110, and is formed of a fixed plate 101 that spans the upper frame 11 and is fixed there and has an LM rail 101a extending in the X direction at the undersurface thereof, a movable base 102 that has an LM block 102a slidably connected to the LM rail 101a, an actuator 103 by which the movable base 102 is moved to and positioned at a predetermined position in the X direction, three guide cylinders 104 (104a, 104b, 104c) that are held by the movable base 102 and have different inner diameters, three guide pieces 105 (105a, 105b, 105c) that correspond to the respective guide cylinders 104 and are disposed thereabove, an actuator 106 by which the guide cylinder 104 that has been selected is pressed against the upper surface of the cylinder block B, and a holding member 107 for directly holding the guide cylinder 104.

Figure 8:
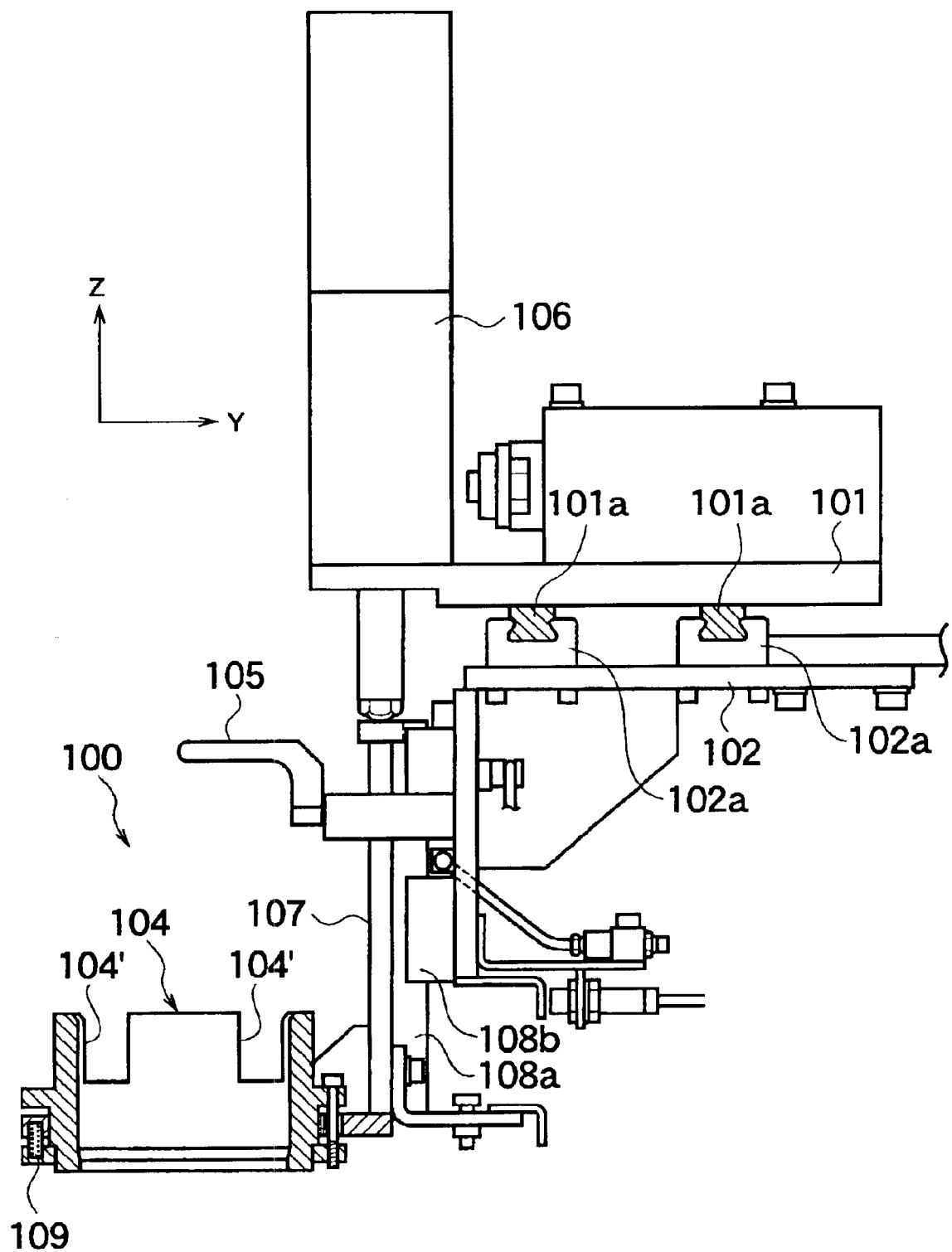
FIG. 8 is a front view showing the piston guide unit.
Figure 9A:
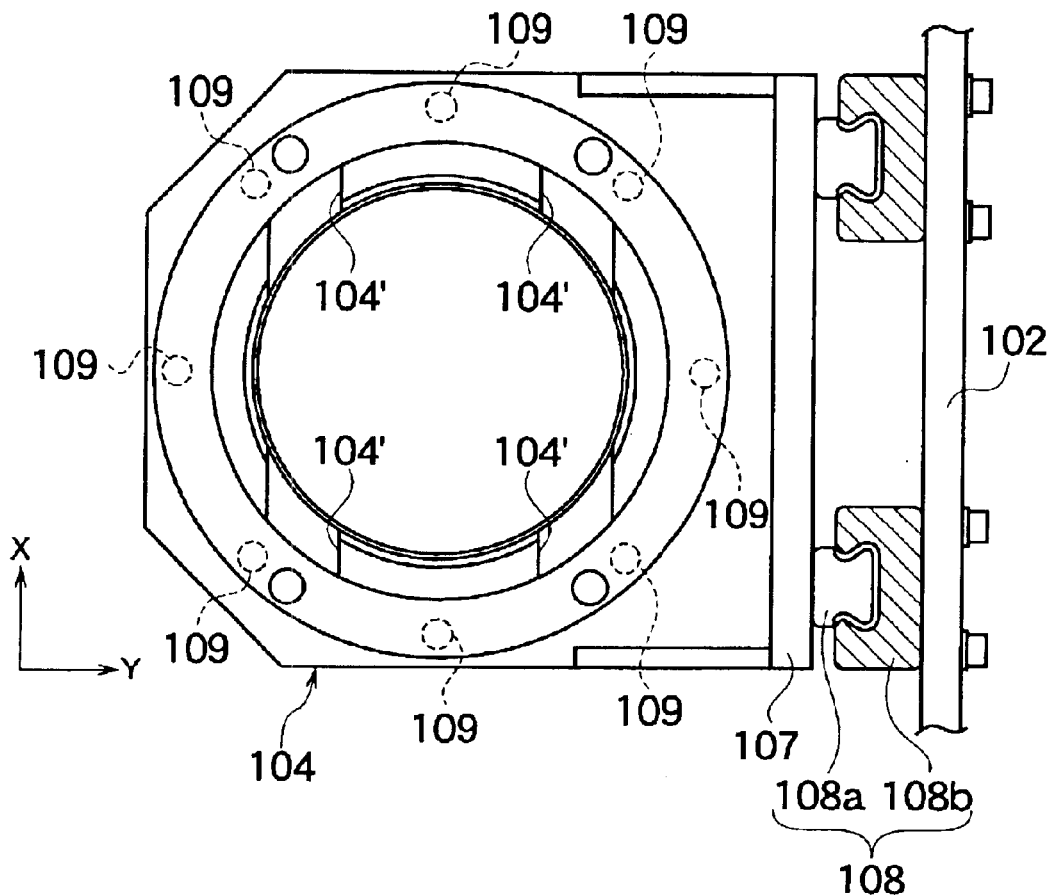
FIG. 9A is a plan view showing a guide cylinder.
Figure 9B:
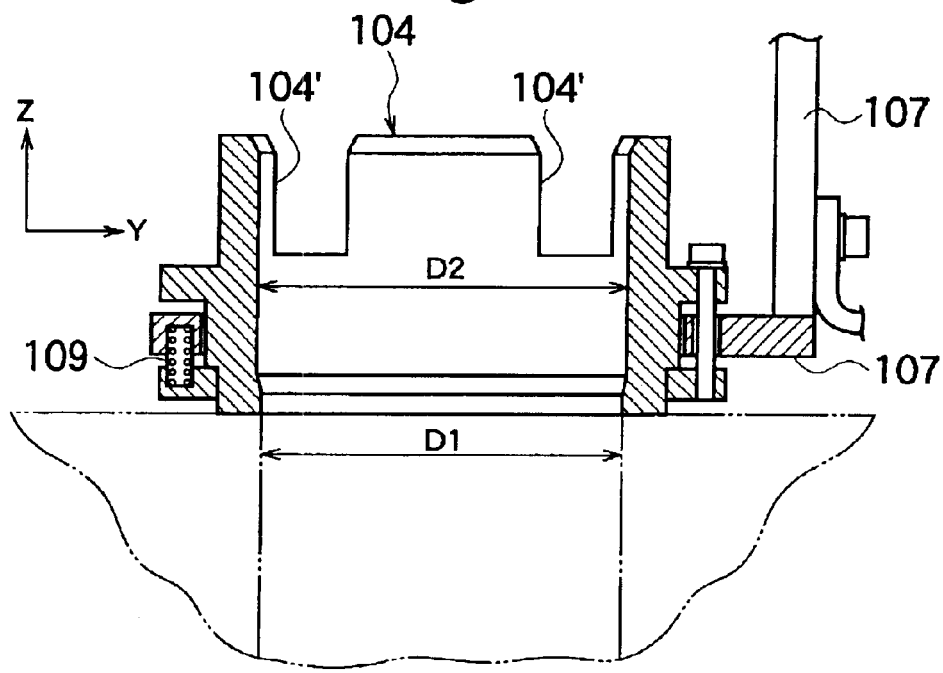
FIG. 9B is a sectional view showing the guide cylinder.

As shown in FIG. 8, FIG. 9A, and FIG. 9B, each of the guide cylinders 104 is formed to have a substantially tapered shape in which the inner diameter D1 of its lower part is smaller than the inner diameter D2 of its upper part, and is formed so that the narrowed inner diameter D1 of the lower part conforms to the predetermined inner diameter of the cylinder bore. Four cut parts 104 that allow the gripping piece 74 to pass through are formed at the upper end of the guide cylinder 104.

As shown in FIG. 8, FIG. 9A, and FIG. 9B, the holding member 107 is supported movably in the Z direction by an LM guide 108 (LM rail 108a, LM block 108b) extending in the Z direction, and is moved in the Z direction by the actuator 106. Each of the guide cylinders 104 is held by the holding member 107 through a coiled spring 109, and can be slightly moved in the Z direction when it is pressed against the upper end surface of the cylinder block B.

Figure 10:
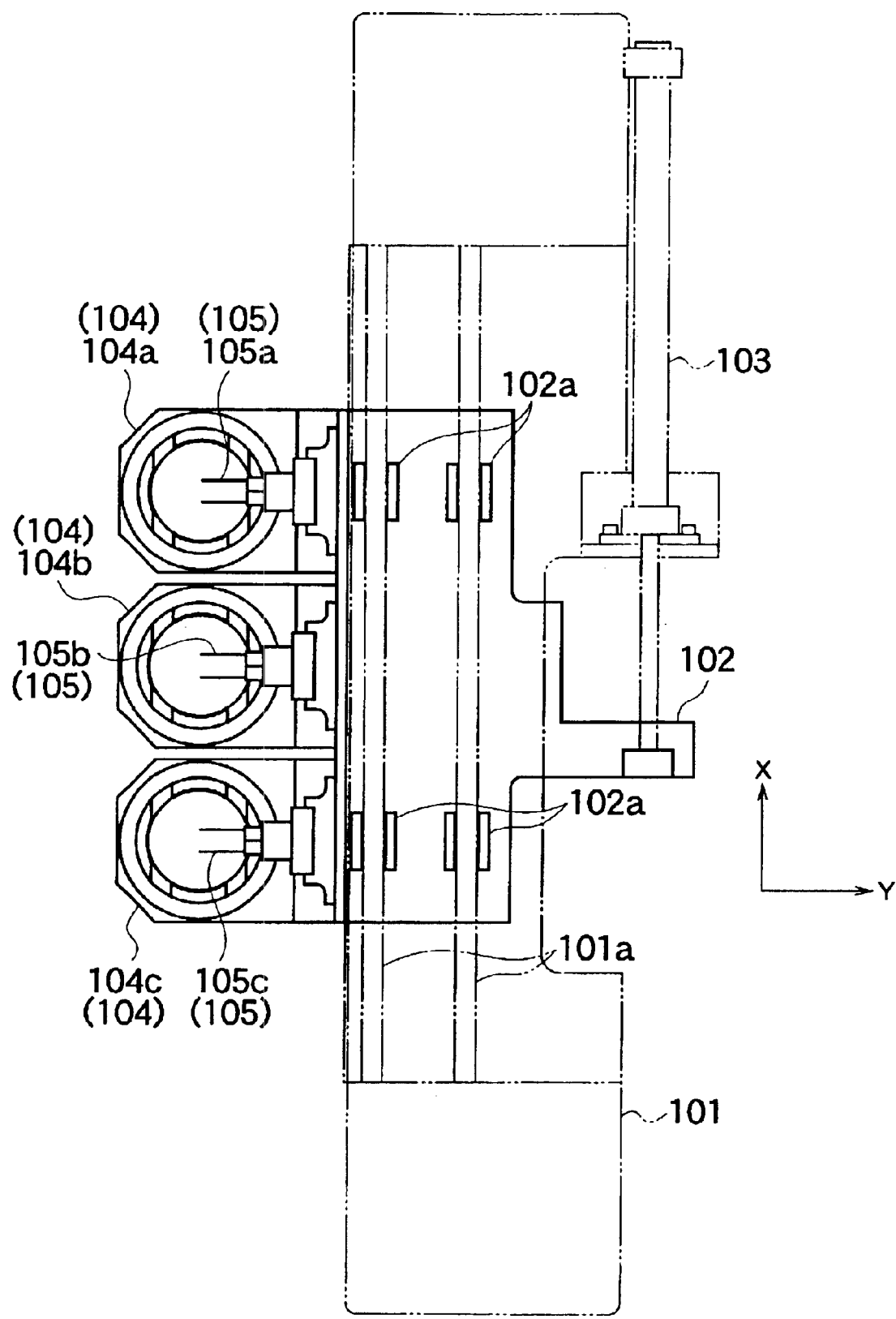
FIG. 10 is a plan view showing a guide-cylinder switching mechanism.

Each of the guide pieces 105 is formed to be opened or closed by an actuator (not shown), and, when the piston P is positioned in this area, the guide piece 105 is positioned at a parallel closed position as shown in FIG. 10, thereby restricting the swinging of the connecting rod R.

The movable base 102, the actuator 103, the LM guide (LM rail 101a, LM block 102a), etc., form a guide-cylinder switching mechanism by which the plurality of guide cylinders 104 are appropriately selected and switched, and are positioned above the cylinder bore.

Further, a two-stage driving mechanism is formed in which the actuator 106 performs first driving that can position the guide cylinder 104 at a non-contact position close to the upper end surface of the cylinder block B and second driving that can bring the guide cylinder 104 into close contact with the upper end surface of the cylinder block B. A cylinder driving mechanism by pneumatic pressure or hydraulic pressure, or the like is used as the actuator 106.

The operations of the piston guide unit 100 and the pushing unit 110 will be described with reference to FIG. 11A through FIG. 11D and FIG. 12A through FIG. 12C. First, the guide cylinder 104 is positioned at the non-contact position close to the upper end surface of the cylinder block B by the first driving of the actuator 106 as shown in FIG. 11A.

Thereafter, in a state where the chuck 115 is retracted, the pushing rod 113 descends by the driving of the actuator 114 as shown in FIG. 11B, and the outer circumferential surface of the pressing portion 113a (specifically, almost the central area of the chuck 115) is positioned at a position facing both the inner circumferential surface of the guide cylinder 104 and the inner circumferential surface of the cylinder bore.

Thereafter, as shown in FIG. 11C, the chuck 115 protrudes outward in the radial direction by the driving of the actuator (not shown), and makes contact with both inner circumferential surfaces. Thereby, centering between the guide cylinder 104 and the cylinder bore is performed.

Thereafter, as shown in FIG. 11D, the holding member 107 descends by the second driving of the actuator 106 in a state where the centering has been performed while the chuck 115 is in contact therewith, and the guide cylinder 104 is pressed to make close contact with the upper end surface of the cylinder block B.

Thereafter, the chuck 115 is retracted, and the pushing rod 113 moves upward by driving of the actuator 114 in an opposite direction, then comes out of the guide cylinder 104, and returns to the standby position. The actuator 106 performs two-stage driving that has first driving and second driving in this way, whereby the guide cylinder 104 can undergo smooth and reliable centering, and can be fixed in a state of being subjected to accurate centering.

Thereafter, the piston P is positioned above the guide cylinder 104 by the piston gripping unit 70 and the transferring unit 90. Thereafter, as shown in FIG. 12A, the movable arm 72 moves downward and stops at a predetermined position where a part of the gripping piece 74 enters the guide cylinder 104 by the driving of the actuator 73.

When the arm 72 moves downward and stops, the guide piece 105 operates to temporarily restrict the swinging of the connecting rod R, and then opens and recedes at a predetermined timing (after the connecting-rod guide unit 120 described later moves upward and the front end 124a of a guide rod 124 enters a screw hole R1 so as to position the connecting rod R). Thereafter, the piston P is lowered to a predetermined open position.

Thereafter, the gripping piece 74 opens to release the piston P, and the movable arm 72 moves upward and stops at the standby position by driving of the actuator 73 in an opposite direction. Since the piston ring is prevented from widening more than a predetermined diameter because of the inner circumferential surface of the guide cylinder 104 at this time even if the gripping piece 74 releases the piston ring, the piston ring is retained in the piston-ring groove while making contact with the inner circumferential surface of the guide cylinder 104 without dropping off from the piston-ring groove.

Thereafter, as shown in FIG. 12B, the pushing rod 113 moves downward again by the driving of the actuator 114 in a state where the chuck 115 is retracted, and the pressing portion 113a makes contact with the upper surface of the piston P. The pushing rod 113 further moves downward, and, as shown in FIG. 12C, the piston P is inserted into the cylinder bore reliably and smoothly by operation of the connecting-rod guide unit 120 described later. Simultaneously, the presence or absence of a bearing metal attached to the connecting rod R is detected by locating a position where the piston P (connecting rod R) is in contact with and stops at the crankshaft S by the inserting operation.

Figure 13:
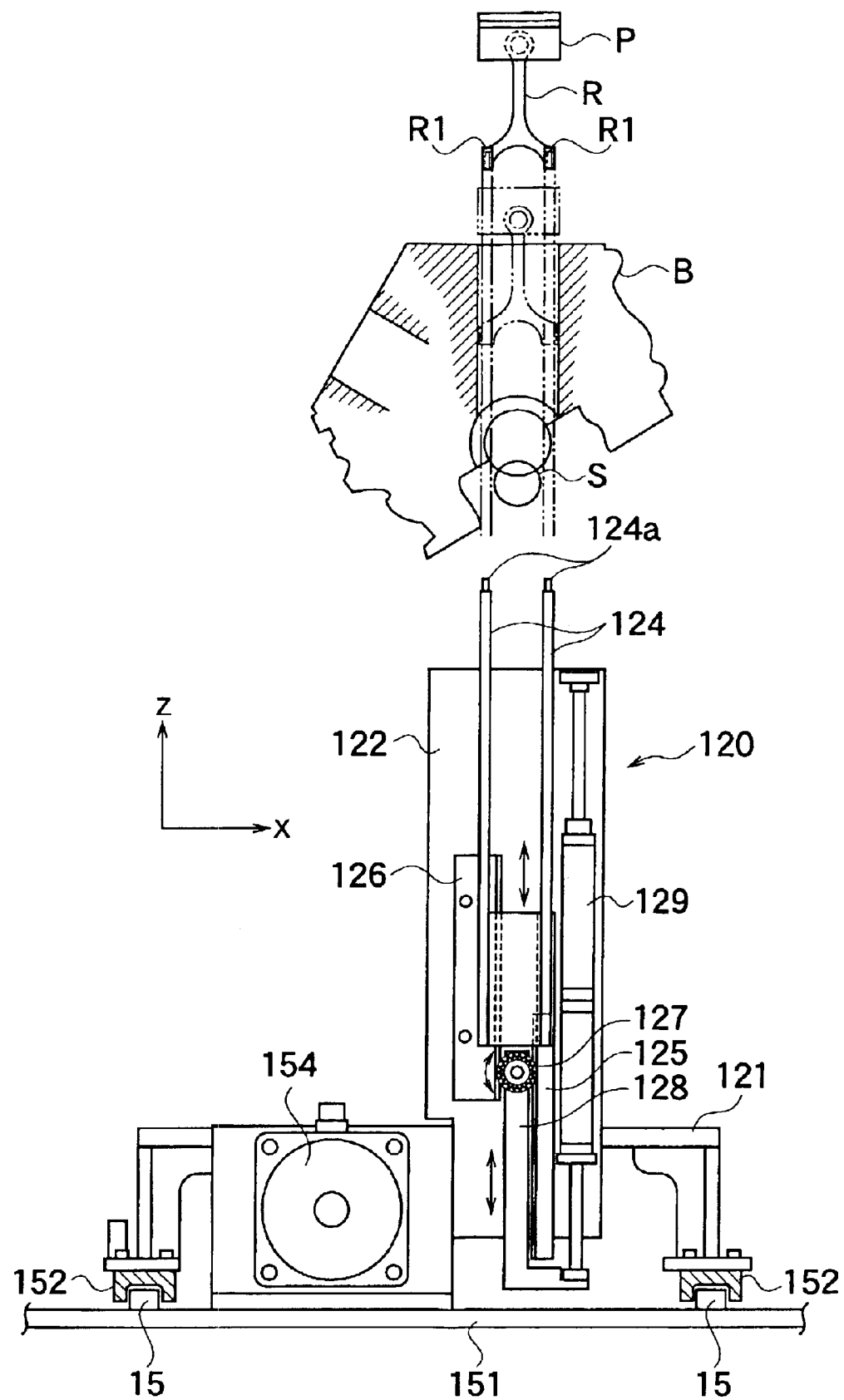
FIG. 13 is a side view showing a connecting-rod guide unit and a transferring unit.
Figure 14:
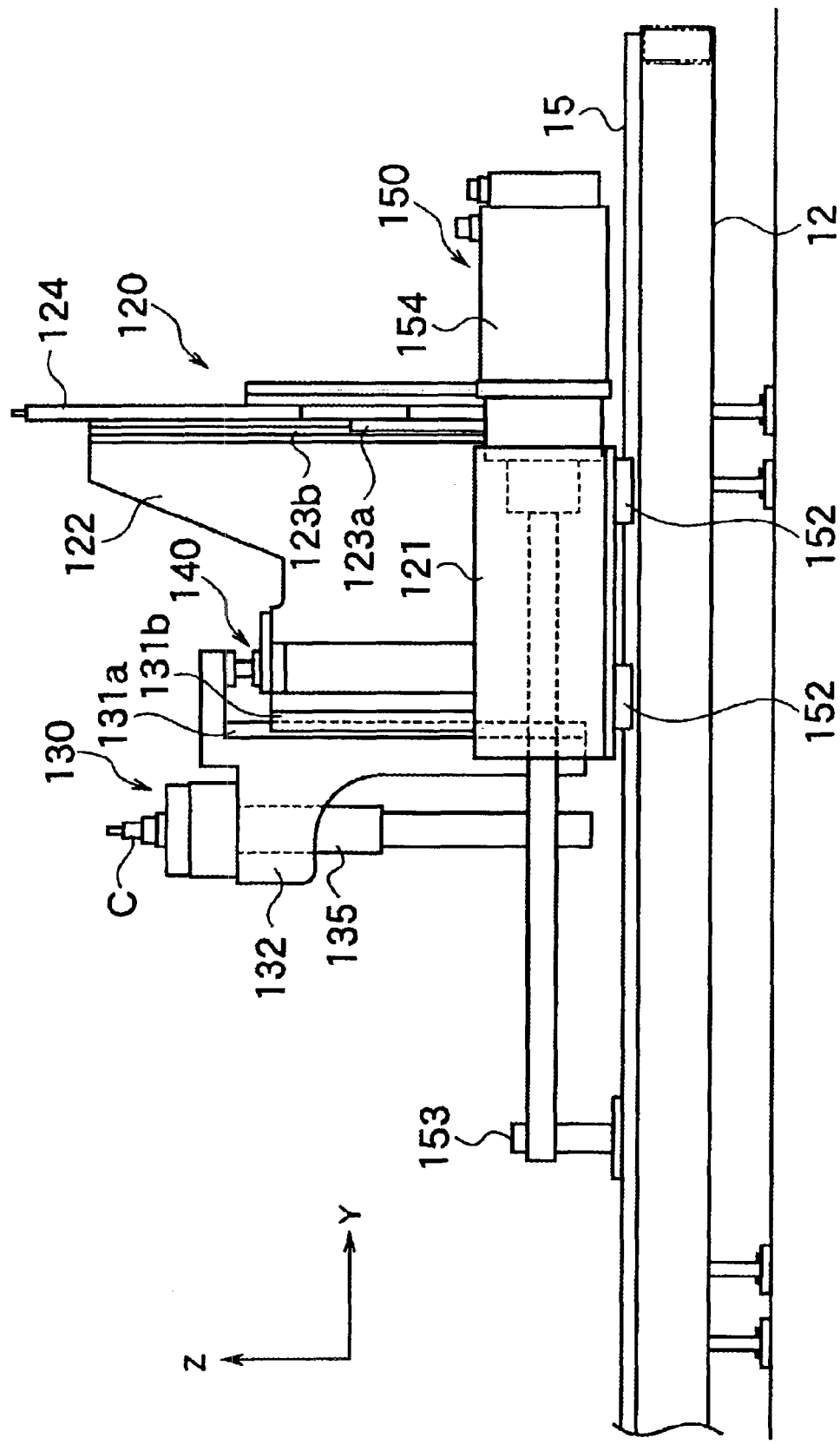
FIG. 14 is a front view showing the connecting-rod guide unit, a fastening unit, a fastening elevating unit, and the transferring unit.

As shown in FIG. 1, FIG. 13, and FIG. 14, the connecting-rod guide unit 120 is disposed under the piston guide unit 100 and the pushing unit 110, and is formed of a movable base 121 that spans the lower frame 12 and is movable in the Y direction, a supporting portion 122 that is fixed to the movable base 121 and extends in the vertical direction, two guide rods 124 supported ascendably/descendably in the Z direction (vertical direction) by an LM guide (LM block 123a, LM rail 123b) with respect to a supporting member 122, a movable rack 125 that moves together with the guide rod 124, a fixed rack 126 fixed to the supporting member 122, a gear 127 that is rotatably disposed between the movable rack 125 and the fixed rack 126 and meshes with them, a movable member 128 that supports the gear 127 and is movable in the Z direction, and an actuator 129 by which the movable member 128 is elevated to and positioned at a predetermined position in the Z direction.

Accordingly, when the movable member 128 begins to move upward by driving of the actuator 129 from a state shown in FIG. 13, the gear 127 rotates counterclockwise, and the movable rack 125, i.e., the guide rod 124 begins to move upward. When the guide rod 124 reaches a predetermined position, the front end 124a thereof enters the screw hole R1 of the connecting rod R, thereby restricting the swinging of the connecting rod R.

Following the operation of the pushing unit 110 by which the piston P is pushed (pressed downward), the guide rod 124 guides the connecting rod R and moves downward. Thereby, the connecting rod R is restricted from swinging, and can be prevented from making contact with the inner circumferential surface of the cylinder bore.

In order to cause the descending operation of the guide rod 124 to reliably follow the descending operation of the piston P, the actuator 129 is designed to prevent the guide rod 124 from dropping off from the connecting rod R, and to lower the movable member 128, i.e., to control a driving force by pneumatic pressure or hydraulic pressure without exerting a resistance force on the descending operation.

As shown in FIG. 14, FIG. 15A, and FIG. 15B, the fastening unit 130 and the fastening elevating unit 140 are provided to the movable base 121 and the supporting member 122 of the connecting-rod guide unit 120.

The fastening unit 130 is formed of a movable frame 132 supported by the supporting member 122 so as to be movable in the Z direction by an LM guide (LM rail 131a, LM block 131b), a cap supporting portion 133 that is held by the movable frame 132 and supports the connecting-rod cap C, two fastening sockets 134 that are to be connected to the fastening bolt CB and exert a fastening force thereon, an actuator 135 for rotating and driving the fastening sockets 134, a detecting sensor 136 for detecting the presence or absence of a bearing metal, and an actuator 137 (air cylinder).

Accordingly, when the actuator 137 is raised and made to contact the crankshaft (crankpin) S prior to the fastening operation of the fastening bolt CB, the actuator 137 stops moving upward. The presence or absence of the bearing metal is detected by distinguishing the ON or OFF of the detecting sensor 136 at the stopping position. After the detecting sensor 136 detects the presence of the bearing metal, a fastening operation by the fastening bolt CB is performed.

The fastening elevating unit 140 is formed by an actuator one end of which is connected to the supporting member 122 and the other end of which is connected to the movable frame 132, and which moves the movable frame 132 in the Z direction (vertical direction) and positions it. A drive motor and a lead screw, a cylinder driving mechanism by pneumatic pressure or hydraulic pressure, or an electromagnetic driving mechanism can be used as the actuator.

As shown in FIG. 1, FIG. 13, and FIG. 14, the transferring unit 150 is formed of a fixed base 151 that spans the lower frame 12 and is fixed there, an LM rail 15 that is fixed to the upper surface of the fixed base 151 and extends in the Y direction, an LM block 152 that is fixed to the undersurface of the movable base 121 and is slidably connected to the LM rail 15, and an actuator 154 that moves the movable base 121 in the Y direction while acting on a connection member 153 disposed at the fixed base 151, and is disposed on the fixed base 151 so as to position it at a predetermined position. Herein, a drive motor and a lead screw, a cylinder driving mechanism by pneumatic pressure or hydraulic pressure, or an electromagnetic driving mechanism can be used as the actuator 154.

Accordingly, the movable base 121 is moved in the Y direction by driving of the actuator 154, and the connecting-rod guide unit 120, the fastening unit 130, and the fastening elevating unit 140 are moved together in the Y direction, and are positioned at a predetermined position. In other words, when the connecting rod R is guided, the movable base 121 is moved leftward in the Y direction in FIG. 1, and the connecting-rod guide unit 120 is positioned under the pushing unit 110. On the other hand, when the connecting-rod cap C is fastened after the insertion of the piston P is completed, the movable base 121 is moved rightward in the Y direction in FIG. 1, and the fastening unit 130 is positioned under the pushing unit 110.

Thus, the transferring unit 150 can serve also as the transferring unit by which the connecting-rod guide unit 120 is moved in the Y direction (horizontal direction) and is positioned at a predetermined position, and also as the transferring unit by which the fastening unit 130 and the fastening elevating unit 140 are moved in the Y direction (horizontal direction) and are positioned at a predetermined position. Therefore, the structure can be simplified by using the transferring units in common.

The fastening unit 130, the fastening elevating unit 140, the transferring unit 150, etc., form a fastening mechanism by which the connecting-rod cap C is fastened to the connecting rod R.

Next, the entire operation of the apparatus will be described with reference to FIG. 16A, FIG. 16B, and FIG. 16C through FIG. 19A, FIG. 19B, and FIG. 19C.

Figure 16A:
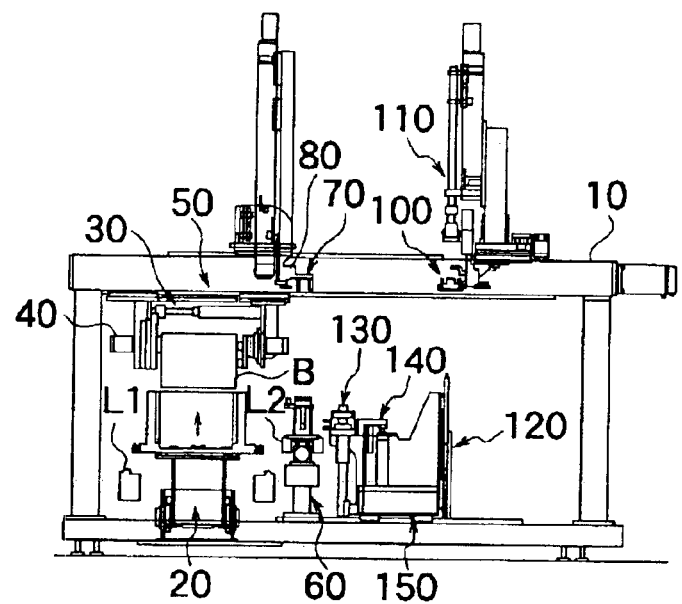
FIG. 16A, FIG. 16B, and FIG. 16C are state diagrams showing the respective operations of the piston installation apparatus.

First, as shown in FIG. 16A, the pallet P1 conveyed by the conveying line L1 is stopped at the position of the block elevating unit 20, is then lifted, and is separated from the conveying line L1. On the other hand, the pallet P2 conveyed by the conveying line L2 is stopped at the position of the holding unit 60, is then lifted, and is separated from the conveying line L2.

Figure 16B:
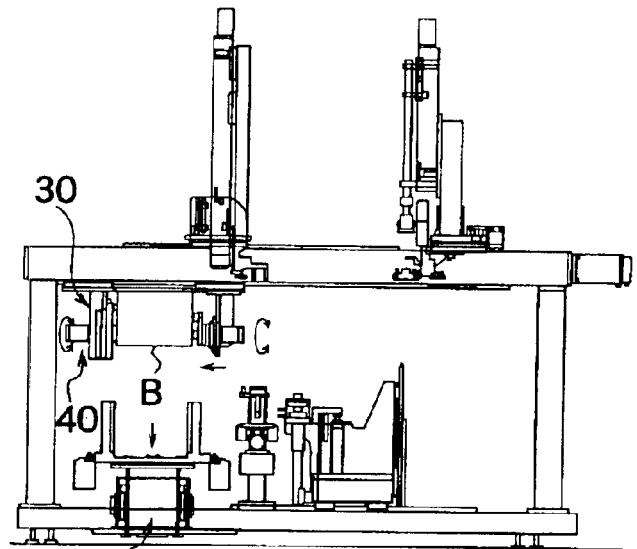

Thereafter, as shown in FIG. 16B, the block gripping unit 30 grips the cylinder block B, and the block elevating unit 20 moves downward. Thereafter, the block gripping unit 30 appropriately rotates the cylinder block B around the crankshaft S, so that the cylinder bore into which the piston P is inserted can be directed upward in the vertical direction. Simultaneously, the shaft rotating unit 40 rotates the crankshaft S, whereby a standby state is reached in which the piston P can be inserted.

Figure 16C:
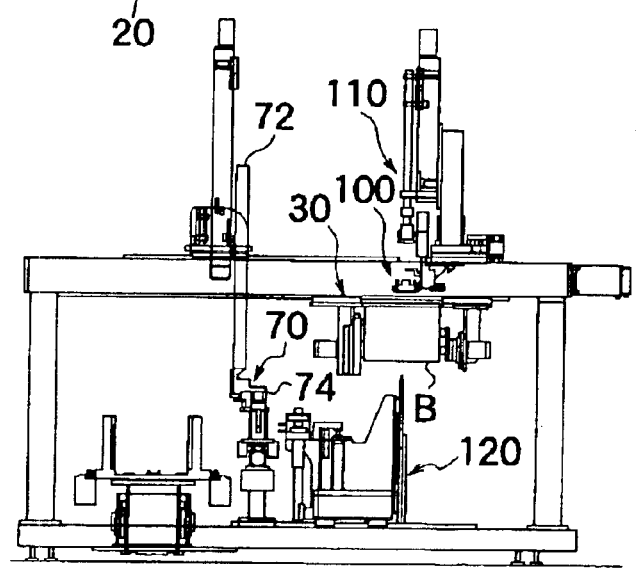

Thereafter, as shown in FIG. 16C, the block gripping unit 30 that is gripping the cylinder block B is moved in the Y direction (rightward) by the transferring unit 50, and is positioned at a piston insertion position under the pushing unit 110 and the piston guide unit 100.

Thereafter, the cap gripping unit 80 is positioned directly above pallet P2 by descent of the movable arm 72, and a pair of gripping pieces 81 grip a given connecting-rod cap C.

Figure 17A:
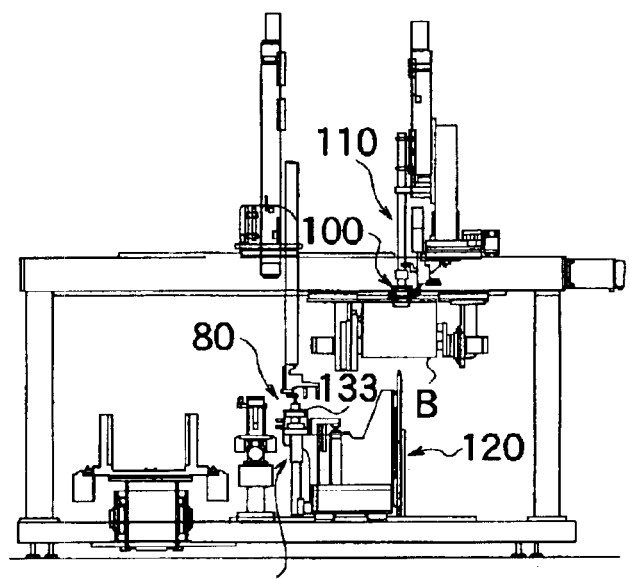
FIG. 17A, FIG. 17B, and FIG. 17C are state diagrams showing the respective operations of the piston installation apparatus.

Thereafter, as shown in FIG. 17A, the cap gripping unit 80 is moved in the Z direction and in the Y direction, and the connecting-rod cap C is transferred onto the cap supporting portion 133 of the fastening unit 130. Simultaneously, the guide cylinder 104 that has been pre-selected by the guide-cylinder switching mechanism is positioned at a non-contact position close to the upper end surface of the cylinder block B by the first driving of the piston guide unit 100, and, in the area covering the inner circumferential surfaces of the guide cylinder 104 and the cylinder bore, the chuck 115 protrudes and makes contact therewith by the driving of the pushing unit 110, thus performing centering therebetween. Further, the guide cylinder 104 is made to closely contact the upper end surface of the cylinder block B by the second driving of the piston guide unit 100, thus performing highly accurate centering.

Figure 17B:
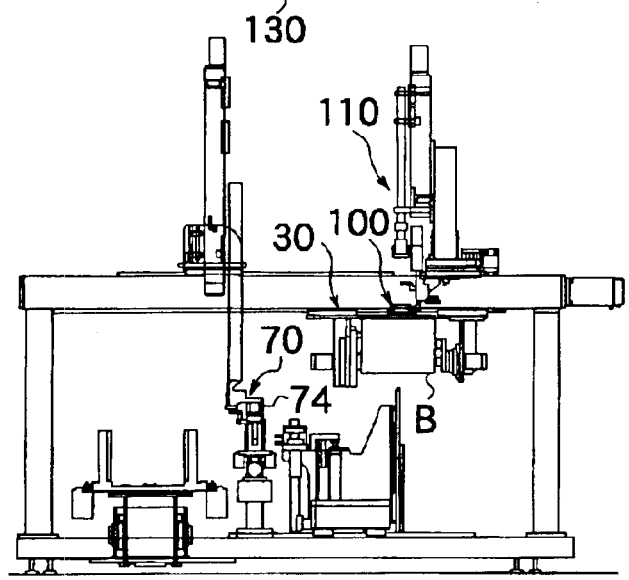

Thereafter, as shown in FIG. 17B, the pushing rod 113 of the pushing unit 110 moves upward and returns to the standby position in a state where the chuck 115 is retracted. Further, the piston gripping unit 70 operates, the gripping piece 74 then moves onto the pallet P2, and a given piston P is gripped.

Figure 17C:
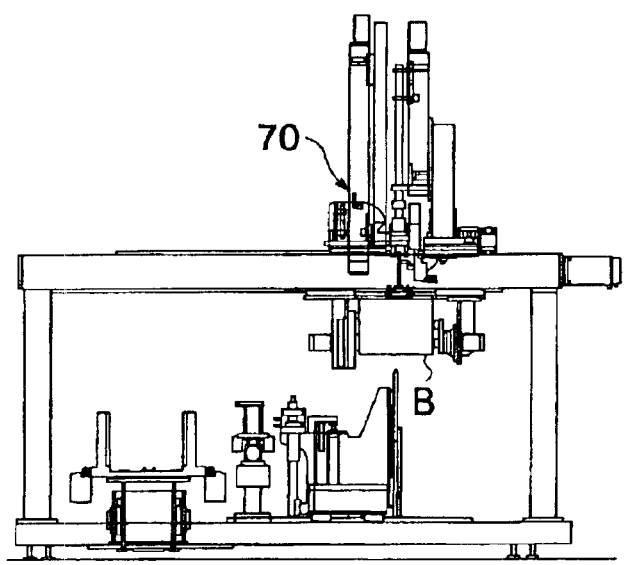

Thereafter, as shown in FIG. 17C, the piston gripping unit 70 moves in the Z direction and in the Y direction (rightward) while gripping the piston P, and the piston P is positioned above the guide cylinder 104.

Figure 18A:
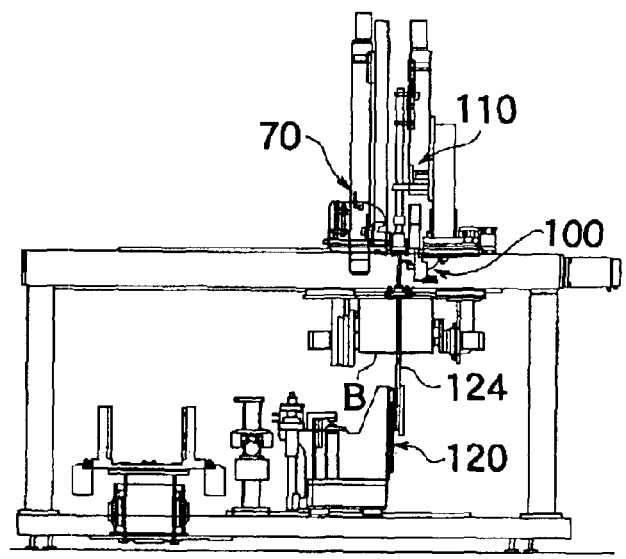
FIG. 18A, FIG. 18B, and FIG. 18C are state diagrams showing the respective operations of the piston installation apparatus.

Thereafter, as shown in FIG. 18A, the pushing unit 110 operates, and the pushing rod 113 (pressing portion 113a) moves downward in the vicinity of the piston P in a state where the chuck 115 is retracted. Further, the connecting-rod guide unit 120 operates, and the guide rod 124 moves upward to a predetermined position in the cylinder bore. Thereafter, the piston gripping unit 70 operates, and the piston P is inserted to an insertion reference position (i.e., position where the piston ring does not drop off from the piston-ring groove) in the guide cylinder 104.

The connecting rod R is guided by the guide rod 124 and is restricted from swinging at this time, and is prevented from colliding with the inner circumferential surface of the cylinder bore. Additionally, when the piston P and the connecting rod R move downward, the guide rod 124 follows them and moves downward without resistance.

Figure 18B:
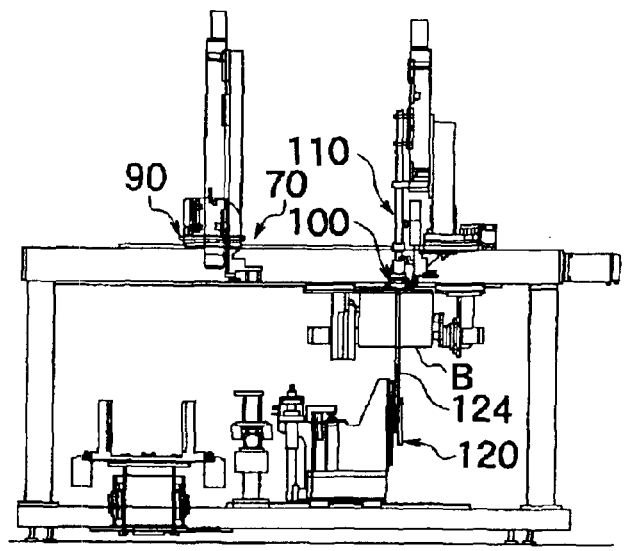

Thereafter, as shown in FIG. 18B, the piston gripping unit 70 releases the piston P, and is moved in the Y direction (leftward), and returns to the standby position. Thereafter, the pushing unit 110 operates, and the piston P is pushed (lowered) into the cylinder bore, and the guide rod 124 moves downward while guiding the connecting rod R. When the connecting rod R makes contact with the crankpin of the crankshaft S, the insertion of the piston P is completed.

Figure 18C:
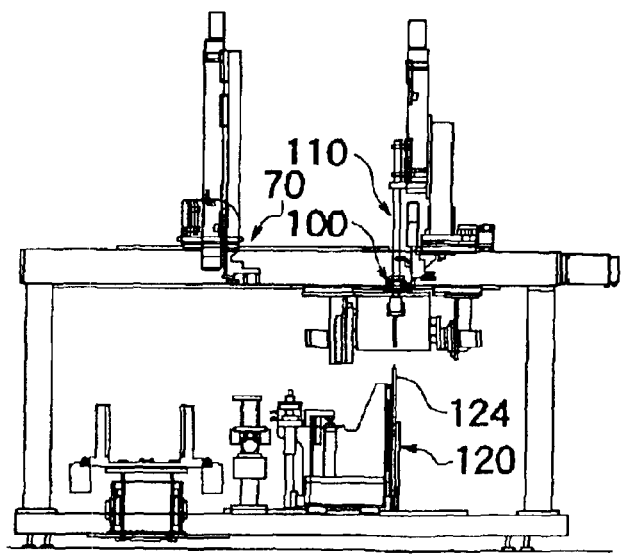

Thereafter, as shown in FIG. 18C, the connecting-rod guide unit 120 lowers the guide rod 124, then separates it from the connecting rod R, and returns to the standby position.

Figure 19A:
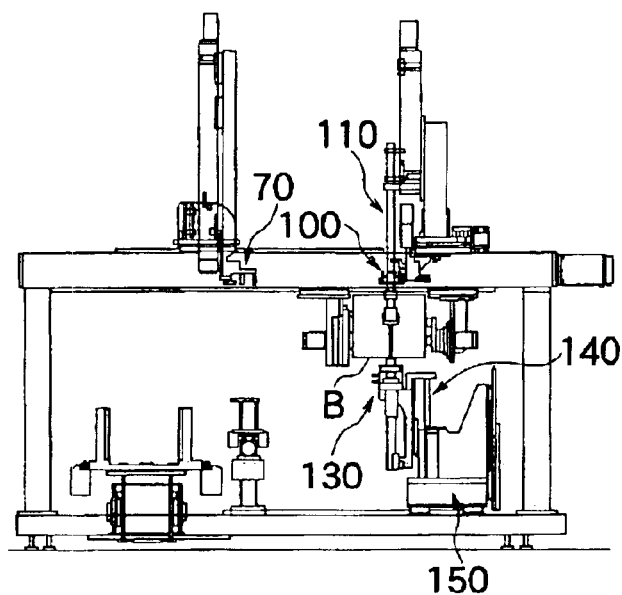
FIG. 19A, FIG. 19B, and FIG. 19C are state diagrams showing the respective operations of the piston installation apparatus.

Thereafter, as shown in FIG. 19A, the fastening unit 130 is moved in the Y direction (rightward) by the driving of the transferring unit 150, and is positioned at a position where the connecting-rod cap C is fastened (i.e., a work-switching operation is performed).

Thereafter, the connecting-rod cap C is lifted to a position where it faces the connecting rod R by the fastening elevating unit 140, and the fastening bolt CB is screwed by the fastening unit 130 (fastening chuck 134 and actuator 135), thereby fastening the connecting-rod cap C. Thus, the installation of one piston P into the cylinder block B is completed. During the fastening operation, the pushing unit 110 presses the piston P from above and reliably positions the piston P.

Figure 19B:
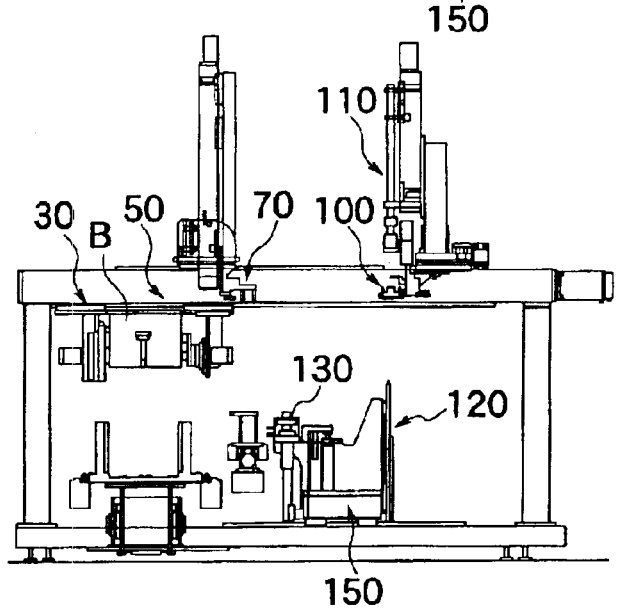

Thereafter, as shown in FIG. 19B, the fastening unit 130 is lowered by the fastening elevating unit 140, is then moved in the Y direction (leftward) by the transferring unit 150, and returns to the standby position. Further, the piston guide unit 100 and the pushing unit 110 are each raised, and return to the standby position.

Herein, in order to install another piston P, the series of operations shown in FIG. 16B through FIG. 19B are repeatedly performed in a state where the block gripping unit 30 is positioned at the insertion position.

Figure 19C:
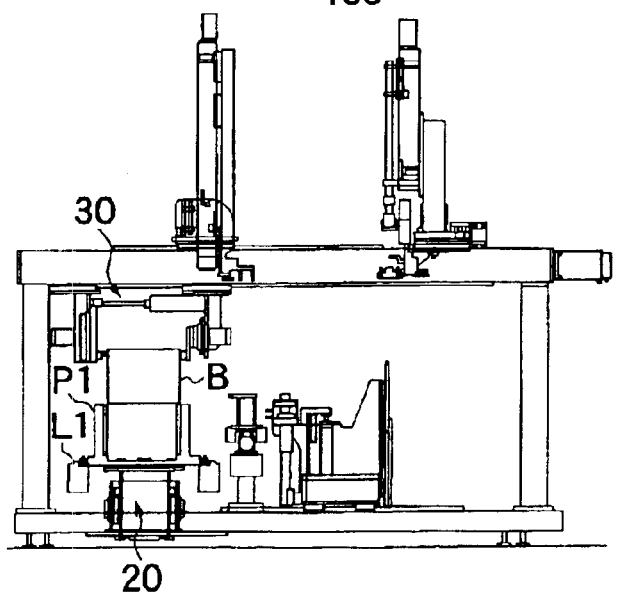

When all installations are completed, the block gripping unit 30 is moved in the Y direction (leftward) by the transferring unit 50 as shown in FIG. 19B, and returns to the standby position above the block elevating unit 20. Thereafter, the block gripping unit 30 causes the cylinder block B to face a predetermined direction as shown in FIG. 19c, and transfers the cylinder block B to the block elevating unit 20 that has been lifted, and, after that, the block elevating unit 20 returns the pallet P1 on which the cylinder block B is placed to the conveying line L1. Thus, the cylinder block B to which the piston P has been attached is conveyed to the downstream side by the conveying line L1.

Herein, a description has been provided of a case where all pistons P are installed by the single piston installation apparatus. However, productivity can be improved by arranging a plurality of piston installation apparatuses for the conveying lines L1 and L2 and sharing the piston P installation.

Figure 20:
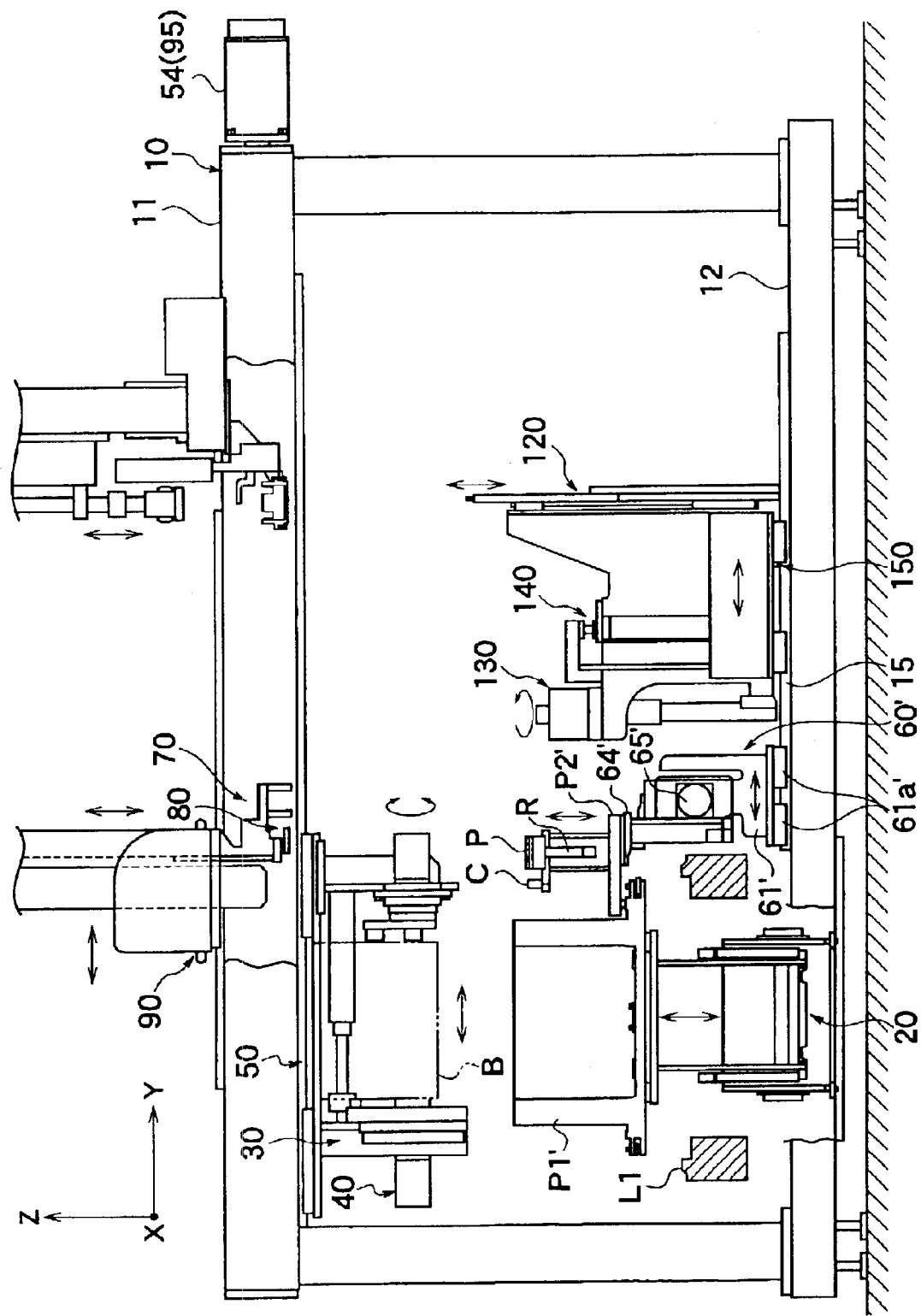
FIG. 20 is a schematic view showing another embodiment of the automatic piston installation apparatus according to the present invention.
Figure 21:
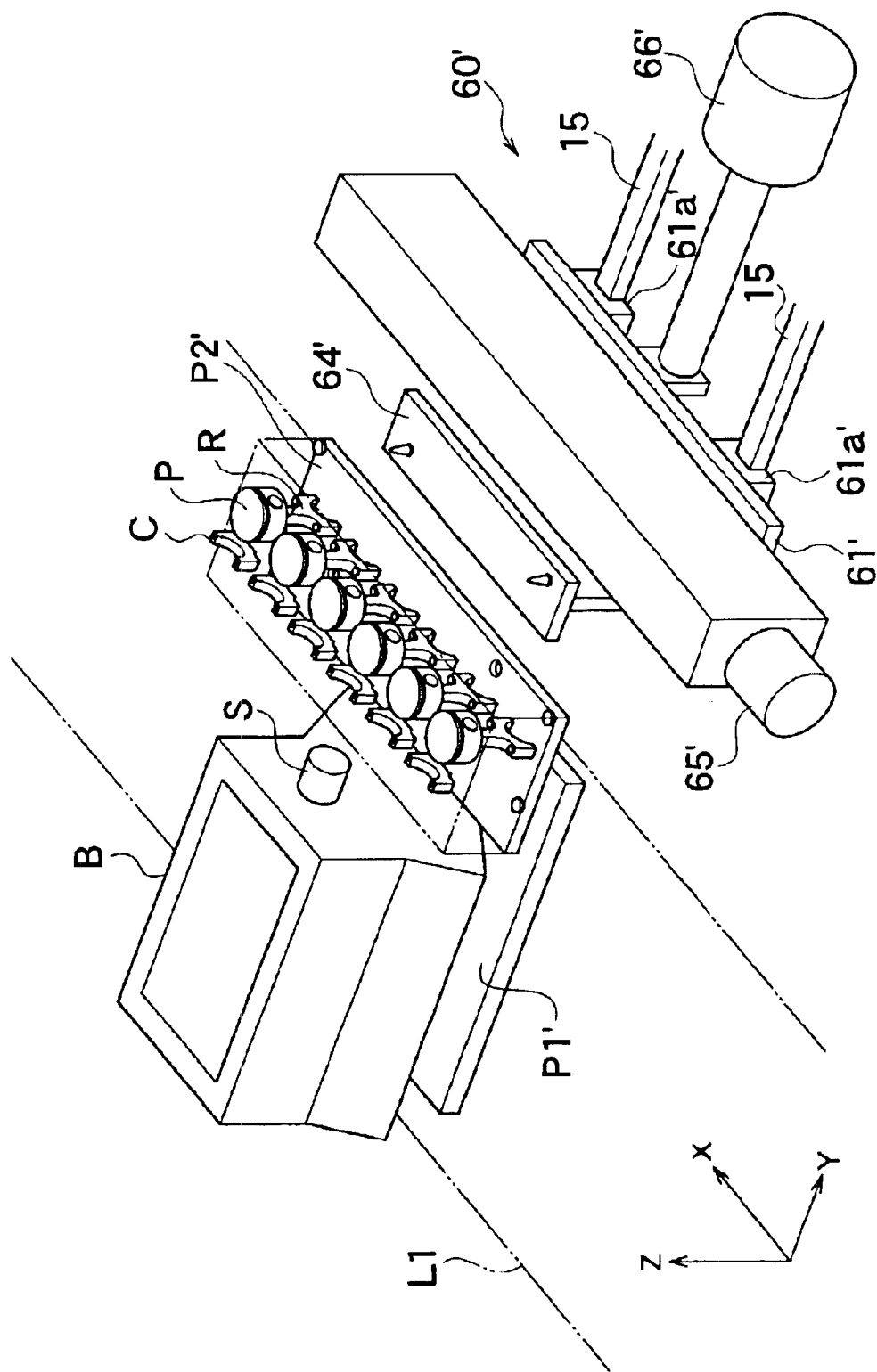
FIG. 21 is a perspective view showing another embodiment of the holding unit.

FIG. 20 and FIG. 21 show another embodiment of the piston installation apparatus according to the present invention. In this embodiment, the same reference symbol is given to the same structure as that of the aforementioned embodiment, and a description of the same structure is omitted. This apparatus is applied to a conveying system that does not use a line (the aforementioned conveying line L2) to convey the piston P and the connecting-rod cap C.

In other words, as shown in FIG. 20, the conveying line L1 of this apparatus conveys together a pallet P1' on which the cylinder block B is placed and a pallet P2' on which the piston P and the connecting-rod cap C are placed and which is connected to the pallet P1' in that state.

As shown in FIG. 20 and FIG. 21, the holding unit 60' is formed of a movable base 61' that is disposed contiguously to the conveying line L1 and has an LM block 61a' slidably connected to the LM rail 15 disposed at the fixed base 151, a movable holding portion 64' that can hold the pallet P2', an actuator 65' for moving the movable holding portion 64' in the Z direction and in the X direction by pneumatic pressure or hydraulic pressure and positioning it, and an actuator 66' that is fixed onto the fixed base 151 and by which the movable base 61' is moved in the Y direction and is positioned.

Accordingly, the pallet P2' on which the piston P and the connecting-rod cap C are placed is conveyed together with the pallet P1' on which the cylinder block B is placed by the conveying line L1, and is stopped at a predetermined position by a stopper mechanism (not shown). Thereupon, the movable holding portion 64' is lifted by the operating actuator 65', and the pallet P2' is lifted and separated from the pallet P1' and the conveying line L1. On the other hand, when the movable holding portion 64' moves downward, the pallet P2' is again connected to the pallet P1', and is returned onto the conveying line L1.

Further, the movable holding portion 64' is moved to and positioned at a predetermined position in the Y direction by the actuator 66', and, when the actuator 65' appropriately moves the movable holding portion 61' in the X direction, the piston P and the connecting-rod cap C to be installed are appropriately positioned at a position where they are gripped by the piston gripping unit 70 and the cap gripping unit 80, respectively.

Since the dedicated conveying line L2 used to convey the piston P and the connecting-rod cap C is not needed in this apparatus, the conveying system is simplified, and this is advantageous for space-saving. Additionally, since a corresponding relationship between the cylinder block B and both the piston P and the connecting-rod cap C to be installed can be ascertained prior to the performance of the conveying step, erroneous installation or the like can be prevented, and productivity is improved.

Since installation of the piston P and the connecting-rod cap C is completely carried out automatically in the apparatuses described above, manual operation by an operator can be omitted, and production costs can be reduced. Additionally, productivity can be, as a whole, improved only by adjusting the operating time of the apparatus.

Additionally, since all of the block gripping unit 30, the piston gripping unit 70, the cap gripping unit 80, the piston guide unit 100, the pushing unit 110, the connecting-rod guide unit 120, the fastening unit 130, etc., are moved only two-dimensionally, i.e., in the Z direction (vertical direction) and in the Y direction (horizontal direction), the positioning of each component is performed with a high degree of accuracy, and therefore the piston P and the connecting-rod cap C can be installed with a high degree of accuracy.

One example has been illustrated as a task sequence performed by each unit in the aforementioned embodiments. However, the present invention is not limited to this, and other task sequences can be employed.

Additionally, in the aforementioned embodiments, each unit has been designed to be movable in the Z direction (vertical direction) and in the Y direction (horizontal direction). However, the present invention is not limited to this, and each unit may be movable in the X direction.

As described above, according to the automatic piston installation apparatus of the present invention, the block positioning mechanism, the piston positioning mechanism, the piston inserting mechanism, the cap positioning mechanism, the fastening mechanism, etc., are employed, and installation of the piston and the connecting-rod cap can be completely carried out automatically. Additionally, the piston is inserted, and the corresponding connecting-rod cap is fastened to the cylinder block (the series of cylinder bores) positioned in the working area apart from the conveying line without changing their directions for piston installation. Therefore, productivity during engine assembly can be improved, and the series of operations can be performed smoothly and reliably.

Additionally, since all cylinder bores can be directed to face the insertion direction (vertical direction) of the piston by the block positioning mechanism, the automatic piston installation can be carried out for not only inline-type engines but also different kinds of engines such as V-type engines.

What is claimed is:

1. An automatic piston installation apparatus for inserting a piston provided with a connecting rod into a cylinder bore, then fastening a connecting-rod cap, and attaching the piston to a crankshaft in a cylinder block provided with the crankshaft, the apparatus comprising:

a block positioning mechanism for positioning the cylinder block at a predetermined position by moving the cylinder block in vertical and horizontal directions or by rotating the cylinder block around the crankshaft;

a piston positioning mechanism for positioning the piston by moving the piston so as to be inserted into the cylinder block positioned by the block positioning mechanism from above in the vertical direction;

a piston inserting mechanism for inserting the piston positioned by the piston positioning mechanism into the cylinder bore from above in the vertical direction;

a cap positioning mechanism for positioning the connecting-rod cap by moving the connecting-rod cap so as to be fastened to the connecting rod of the piston inserted by the piston inserting mechanism from below in the vertical direction; and a fastening mechanism for fastening the connecting-rod cap from below in the vertical direction.

2. The automatic piston installation apparatus of claim 1, wherein the block positioning mechanism includes:

a block elevating unit for separating the cylinder block conveyed by a conveying line from the conveying line and holding the cylinder block;

a block gripping unit for gripping the cylinder block held by the block elevating unit and rotating the cylinder block so as to direct a cylinder bore in the vertical direction;

a shaft rotating unit, formed integrally with the block gripping unit, for rotating the crankshaft; and a block transferring unit for transferring the block gripping unit in the horizontal direction and positioning the block gripping unit at a predetermined position in a working area.

3. The automatic piston installation apparatus of claim 2, wherein the piston positioning mechanism includes:

a holding unit for separating the piston conveyed by a conveying line from the conveying line, holding the piston, moving the piston in the horizontal direction, and positioning the piston;

a piston gripping unit for moving the piston held by the holding unit in the vertical direction while gripping the piston; and a transferring unit for transferring the piston gripping unit in the horizontal direction and positioning the piston gripping unit at a predetermined position in a working area, the piston inserting mechanism including a piston guide unit for guiding the piston gripped by the piston gripping unit into a cylinder bore, a pushing unit for pushing the piston guided by the piston guide unit from above, and a connecting-rod guide unit for guiding the connecting rod of the piston pushed by the pushing unit while lowering the connecting rod, the cap gripping unit being formed integrally with the piston gripping unit, and the transferring unit of the piston gripping unit serving also as the transferring unit of the can gripping unit, the fastening mechanism including a fastening unit for holding the connecting-rod cap transferred by the transferring unit and exerting a fastening force on a fastening bolt, a fastening elevating unit for elevating the fastening unit, and a transferring unit for transferring the fastening unit and the fastening elevating unit in the horizontal direction and positioning these at a predetermined position in a working area, and the apparatus further including an upper frame and a lower frame that are separated from each other in the vertical direction and are disposed in parallel, wherein the upper frame supports the block transferring unit and the transferring unit of both the piston gripping unit and the cap gripping unit, and the lower frame supports the transferring unit of the connecting-rod guide unit, the fastening unit, and the fastening elevating unit.

4. The automatic piston installation apparatus of claim 1, wherein the piston positioning mechanism includes:

a holding unit for separating the piston conveyed by a conveying line from the conveying line, holding the piston, moving the piston in the horizontal direction, and positioning the piston;

a piston gripping unit for moving the piston held by the holding unit in the vertical direction while gripping the piston; and a transferring unit for transferring the piston gripping unit in the horizontal direction and positioning the piston gripping unit at a predetermined position in a working area.

5. The automatic piston installation apparatus of claim 4, wherein the piston inserting mechanism includes a piston guide unit for guiding the piston gripped by the piston gripping unit into a cylinder bore, a pushing unit for pushing the piston guided by the piston guide unit from above, and a connecting-rod guide unit for guiding the connecting rod of the piston pushed by the pushing unit while lowering the connecting rod;

the piston guide unit includes a plurality of guide cylinders having predetermined inner diameters so as to guide different kinds of pistons, respectively, and a guide-cylinder switching mechanism for appropriately selecting and switching the plurality of guide cylinders and positioning them on cylinder bores; and the pushing unit includes a columnar pressing portion that can make contact with an upper surface of the piston and a chuck freely protruding/retracting in a radial direction from an outer circumferential surface of the columnar pressing portion so as to perform centering between the guide cylinder and the cylinder bore while making contact with inner circumferential surfaces of the guide cylinder and the cylinder bore.

6. The automatic piston installation apparatus of claim 5, wherein the piston guide unit includes a two-stage driving mechanism for performing a first driving by which the guide cylinder is positioned at a non-contact position close to an upper end surface of the cylinder block and a second driving by which the guide cylinder is made to closely contact with the upper end surface of the cylinder block; and the pushing unit includes a driving mechanism by which the columnar pressing portion is lowered to an area covering the guide cylinder and the cylinder bore in a state where the chuck is refracted, and, thereafter, the chuck is caused to protrude so as to make contact with the guide cylinder and an inner circumferential surface of the cylinder bore, the two-stage driving mechanism performing the second driving in a state where the chuck is made to contact the inner circumferential surfaces of the guide cylinder and the cylinder bore by driving the driving mechanism.

7. The automatic piston installation apparatus of claim 4, wherein a pallet that holds both the piston and the connecting-rod is conveyed by the same conveying line together with a pallet of the cylinder block.

8. The automatic piston installation apparatus of claim 1, wherein the cap positioning mechanism includes a holding unit for separating the connecting-rod cap conveyed by a conveying line from the conveying line and holding the connecting-rod cap and moving the connecting-rod cap in the horizontal direction so as to position it, a cap gripping unit for moving the connecting-rod cap held by the holding unit in the vertical direction while gripping the connecting-rod cap, and a transferring unit for transferring the cap gripping unit in the horizontal direction and positioning the cap gripping unit at a predetermined position in a working area.

9. The automatic piston installation apparatus of claim 8, wherein the piston positioning mechanism includes:

a holding unit for separating the piston conveyed by a conveying line from the conveying line, holding the piston, moving the piston in the horizontal direction, and positioning the piston;

a piston gripping unit for moving the piston held by the holding unit in the vertical direction while gripping the piston; and a transferring unit for transferring the piston gripping unit in the horizontal direction and positioning the piston gripping unit at a predetermined position in a working area, the cap gripping unit being formed integrally with the piston gripping unit, and the transferring unit of the piston gripping unit serving also as the transferring unit of the cap gripping unit.

10. The automatic piston installation apparatus of claim 8, wherein the piston and the connecting-rod cap are held by the same pallet, and a holding unit of the piston serves also as the holding unit of the connecting-rod cap.

11. The automatic piston installation apparatus of claim 1, wherein the cap positioning mechanism includes a holding unit for separating the connecting-rod cap conveyed by a conveying line from the conveying line and holding the connecting-rod cap and moving the connecting-rod cap in the horizontal direction so as to position it, a cap gripping unit for moving the connecting-rod cap held by the holding unit in the vertical direction while gripping the connecting-rod cap, and a transferring unit for transferring the cap gripping unit in the horizontal direction and positioning the cap gripping unit at a predetermined position in a working area, and the fastening mechanism includes a fastening unit for holding the connecting-rod cap transferred by the transferring unit and exerting a fastening force on a fastening bolt, a fastening elevating unit for elevating the fastening unit, and a transferring unit for transferring the fastening unit and the fastening elevating unit in the horizontal direction and positioning these at a predetermined position in a working area.

12. The automatic piston installation apparatus of claim 11, wherein the piston positioning mechanism includes:

a holding unit for separating the piston conveyed by a conveying line from the conveying line, holding the piston, moving the piston in the horizontal direction, and positioning the piston;

a piston gripping unit for moving the piston held by the holding unit in the vertical direction while gripping the piston; and a transferring unit for transferring the piston gripping unit in the horizontal direction and positioning the piston gripping unit at a predetermined position in a working area, the piston inserting mechanism including a piston guide unit for guiding the piston gripped by the piston gripping unit into a cylinder bore, a pushing unit for pushing the piston guided by the piston guide unit from above, and a connecting-rod guide unit for guiding the connecting rod of the piston pushed by the pushing unit while lowering the connecting rod, and the apparatus further including a transferring unit for transferring the connecting-rod guide unit in the horizontal direction and positioning it at a predetermined position, wherein the transferring unit of the connecting-rod guide unit serves also as the transferring unit of the fastening unit and the fastening elevating unit.

13. An automatic piston installation apparatus comprising:

a block positioning mechanism for positioning a cylinder block at a predetermined position by moving the cylinder block in vertical and horizontal directions;

a piston positioning mechanism for positioning a piston by moving the piston so as to be inserted into the cylinder block positioned by the block positioning mechanism from above in the vertical direction;

a piston inserting mechanism for inserting the piston positioned by the piston positioning mechanism into a cylinder bore from above in the vertical direction, wherein the piston inserting mechanism includes a piston guide unit for guiding the piston gripped by a piston gripping unit into a cylinder bore, a pushing unit for pushing the piston guided by the piston guide unit from above, and a connecting-rod guide unit for guiding the connecting rod of the piston pushed by the pushing unit while lowering the connecting rod;

a cap positioning mechanism for positioning the connecting-rod cap by moving the connecting-rod cap so as to be fastened to the connecting rod of the piston inserted by the piston inserting mechanism from below in the vertical direction; and a fastening mechanism for fastening the connecting-rod cap from below in the vertical direction.

14. The automatic piston installation apparatus of claim 13, wherein the block positioning mechanism positions the cylinder block by rotating the cylinder block around the crankshaft.

15. The automatic piston installation apparatus of claim 13, wherein the piston guide unit includes a plurality of guide cylinders having predetermined inner diameters so as to guide different kinds of pistons, respectively, and a guide-cylinder switching mechanism for appropriately selecting and switching the plurality of guide cylinders and positioning them on cylinder bores.

16. The automatic piston installation apparatus of claim 13, wherein the pushing unit includes a columnar pressing portion that cap make contact with an upper surface of the piston and a chuck freely protruding/retracting in a radial direction from an outer circumferential surface of the pressing portion so as to perform centering between the guide cylinder and the cylinder bore while making contact with inner circumferential surfaces of guide cylinder and the cylinder bore.

17. The automatic piston installation apparatus of claim 13, further comprising:

a connecting-rod guide unit for guiding the connecting rod of the piston; and a transferring unit for transferring the connecting-rod guide unit in the horizontal direction and positioning it at a predetermined position, wherein the transferring unit of the connecting-rod guide unit serves also as the transferring unit of the fastening unit and the fastening elevating unit.

18. An automatic piston installation apparatus comprising:

a block positioning mechanism for positioning a cylinder block at a predetermined position by moving the cylinder block in vertical and horizontal directions;

a piston positioning mechanism for positioning a piston by moving the piston so as to be inserted into the cylinder block positioned by the block positioning mechanism from above in the vertical direction;

a piston inserting mechanism for inserting the piston positioned by the piston positioning mechanism into a cylinder bore from above in the vertical direction;

a cap positioning mechanism for positioning a connecting-rod cap by moving the connecting-rod cap so as to be fastened to a connecting rod of the piston inserted by the piston inserting mechanism from below in the vertical direction; and a fastening mechanism for fastening the connecting-rod cap from below in the vertical direction, wherein the fastening mechanism includes a fastening unit for holding the connecting-rod cap and exerting a fastening force on a fastening bolt, a fastening elevating unit for elevating the fastening unit, and a transferring unit for transferring the fastening unit and the fastening elevating unit in the horizontal direction and positioning these at a predetermined position in a working area.

19. An automatic piston installation apparatus comprising:

a block positioning mechanism for positioning a cylinder block at a predetermined position by moving the cylinder block in vertical and horizontal directions or by rotating the cylinder block around a crankshaft, wherein the block positioning mechanism includes:

a block elevating unit for separating the cylinder block conveyed by a conveying line from the conveying line and holding the cylinder block, a block gripping unit for gripping the cylinder block held by the block elevating unit and rotating the cylinder block so as to direct a cylinder bore in the vertical direction, a shaft rotating unit, formed integrally with the block gripping unit, for rotating the crankshaft, and a block transferring unit for transferring the block gripping unit in the horizontal direction and positioning the block gripping unit at a predetermined position in a working area;

a piston positioning mechanism for positioning a piston by moving the piston so as to be inserted into the cylinder block positioned by the block positioning mechanism from above in the vertical direction;

a piston inserting mechanism for inserting the piston positioned by the piston positioning mechanism into a cylinder bore from above in the vertical direction;

a cap positioning mechanism for positioning a connecting-rod cap by moving the connecting-rod cap so as to be fastened to a connecting rod of the piston inserted by the piston inserting mechanism from below in the vertical direction;

a fastening mechanism for fastening the connecting-rod cap from below in the vertical direction; and an upper frame and a lower frame that are separated from each other in the vertical direction and are disposed in parallel, wherein the upper frame supports the block transferring unit and a transferring unit of both a piston gripping unit and a cap gripping unit, and the lower frame supports a transferring unit of the connecting-rod guide unit, a fastening unit, and a fastening elevating unit.

* * * * *